US010452219B2

United States Patent
Church et al.

(10) Patent No.: US 10,452,219 B2
(45) Date of Patent: Oct. 22, 2019

(54) TOUCH SENSOR

(71) Applicant: Solomon Systech Limited, Hong Kong (HK)

(72) Inventors: Justin Anthony Church, Whiteley (GB); David Brent Guard, Whiteley (GB)

(73) Assignee: Solomon Systech Limited, Hong Kong (HK)

( * ) Notice: Subject to any disclaimer, the term of this patent is extended or adjusted under 35 U.S.C. 154(b) by 0 days.

(21) Appl. No.: 15/886,864

(22) Filed: Feb. 2, 2018

(65) Prior Publication Data

US 2018/0224966 A1     Aug. 9, 2018

(30) Foreign Application Priority Data

Feb. 9, 2017 (GB) .................................. 1702117.1

(51) Int. Cl.
*G06F 3/044* (2006.01)
*G06F 3/0354* (2013.01)
*G06F 3/041* (2006.01)

(52) U.S. Cl.
CPC .......... *G06F 3/044* (2013.01); *G06F 3/03547* (2013.01); *G06F 3/0412* (2013.01); *G06F 2203/04103* (2013.01); *G06F 2203/04112* (2013.01)

(58) Field of Classification Search
None
See application file for complete search history.

(56) References Cited

U.S. PATENT DOCUMENTS

| | | |
|---|---|---|
| 2009/0194344 A1 | 8/2009 | Harley et al. |
| 2010/0156810 A1 | 6/2010 | Barbier |
| 2013/0155012 A1 | 6/2013 | Chang |
| 2014/0062934 A1* | 3/2014 | Coulson .................. G06F 3/044 345/174 |
| 2014/0168147 A1 | 6/2014 | Huang |
| 2014/0192007 A1* | 7/2014 | Westhues ................ G06F 3/044 345/174 |
| 2014/0226089 A1 | 8/2014 | Guard |
| 2015/0029129 A1* | 1/2015 | Trend ...................... G06F 3/044 345/174 |
| 2016/0259481 A1 | 9/2016 | Lee |
| 2017/0139527 A1* | 5/2017 | Nathan .................. G06F 3/0418 |

* cited by examiner

*Primary Examiner* — Christopher J Kohlman
(74) *Attorney, Agent, or Firm* — Idea Intellectual Limited; Margaret A. Burke; Sam T. Yip

(57) ABSTRACT

In a capacitive touch sensor device, to avoid floating touches causing signal inversion in mutual capacitance measurements, a segmented conductive layer of conductive material is embedded in the touch panel. The segmented conductive layer comprises a plurality of segments of the conductive material which are separated by gaps. The segmented conductive layer effectively pre-loads the mutual capacitance of the touch sensor to the same or similar level of that of a floating touch of the maximum size for which it is desired to avoid signal inversion.

34 Claims, 17 Drawing Sheets

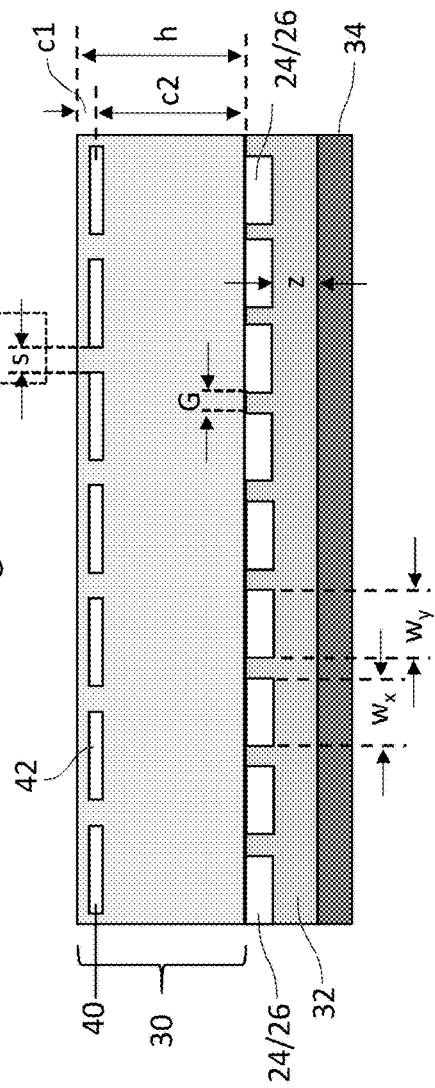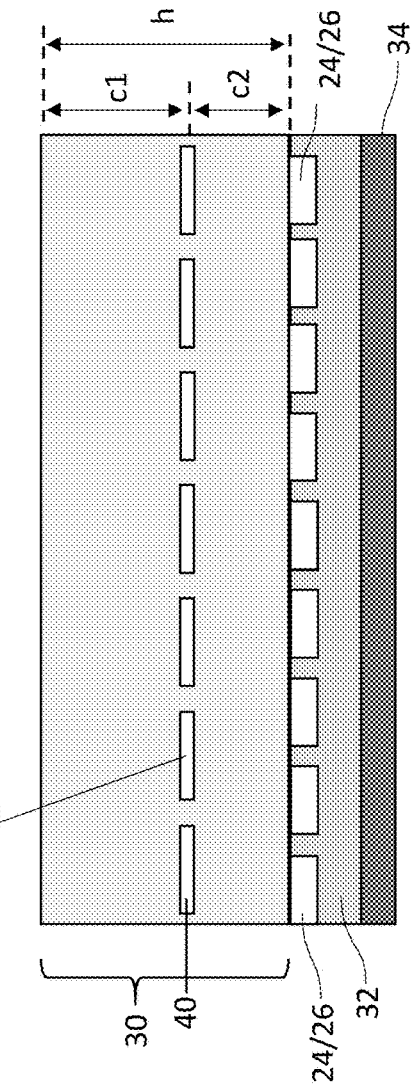

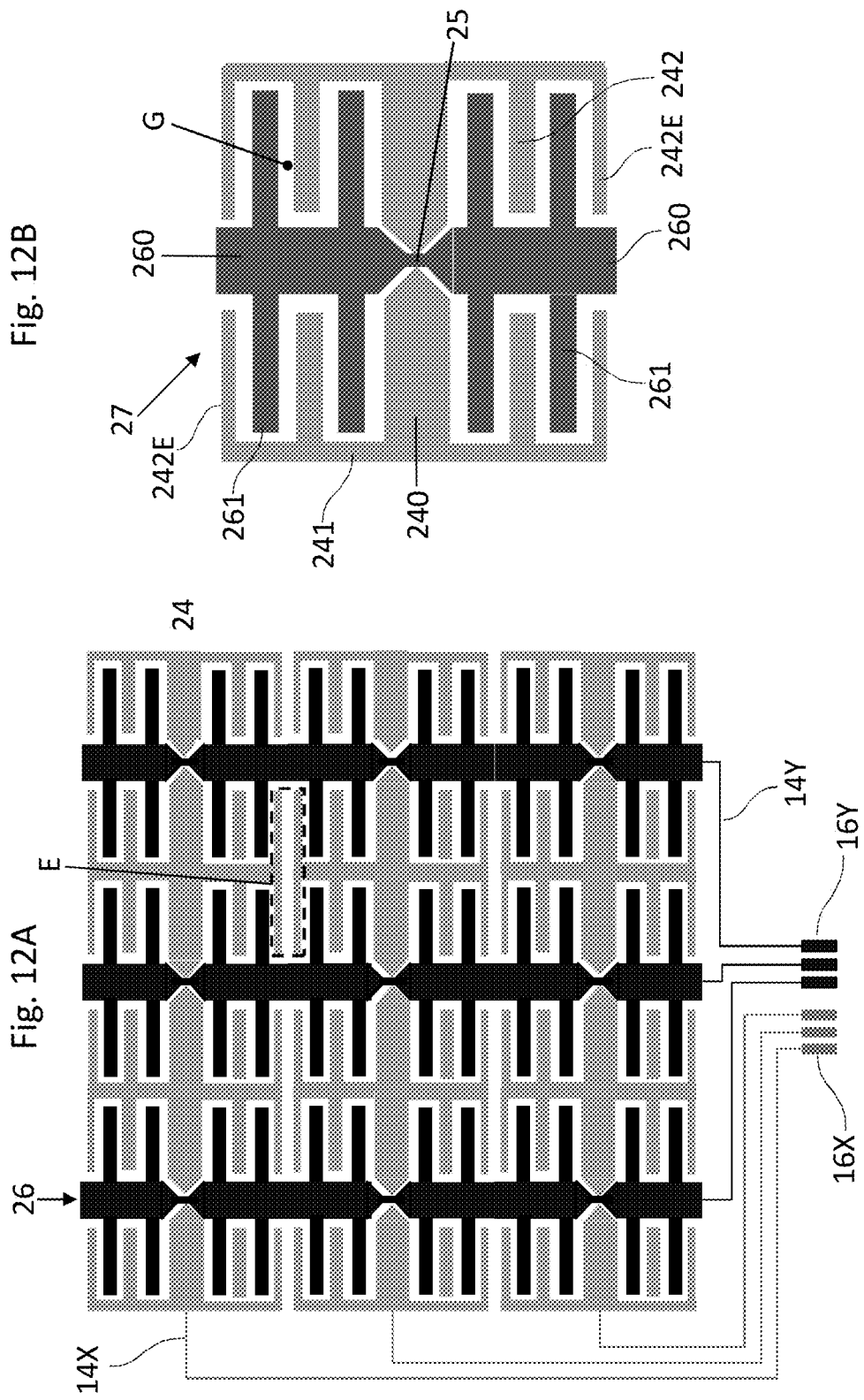

Fig. 18

HYBRID IN-CELL OLED

| | | |
|---|---|---|
| TOUCH SENSOR STACK { | TOUCH PANEL 30 WITH SC LAYER | S1 |
| | DECORATION | D1 |
| | POLARISER | S2 |
| | X & Y ELECTRODES | S3 |
| | SUBSTRATE | S4 |
| OLED DISPLAY STACK { | METAL (CATHODE) | D2 |
| | OLEDs | D3 |
| | METAL (ANODE) & TFTs | D4 |
| | TFT GLASS | D5 |

Fig. 19

HYBRID IN-CELL OLED

| | | |
|---|---|---|
| TOUCH SENSOR STACK { | TOUCH PANEL 30 WITH SC LAYER | S1 |
| | DECORATION | S2 |
| | POLARISER | D1 |
| | METAL (CATHODE/Y ELECTRODES) | D2/S3 |
| | DIELECTRIC | D3/S4 |
| | OLEDs | D4 |
| OLED DISPLAY STACK { | METAL (ANODE/X ELECTRODES) & TFTs | D5/S5 |
| | TFT GLASS | D6 |

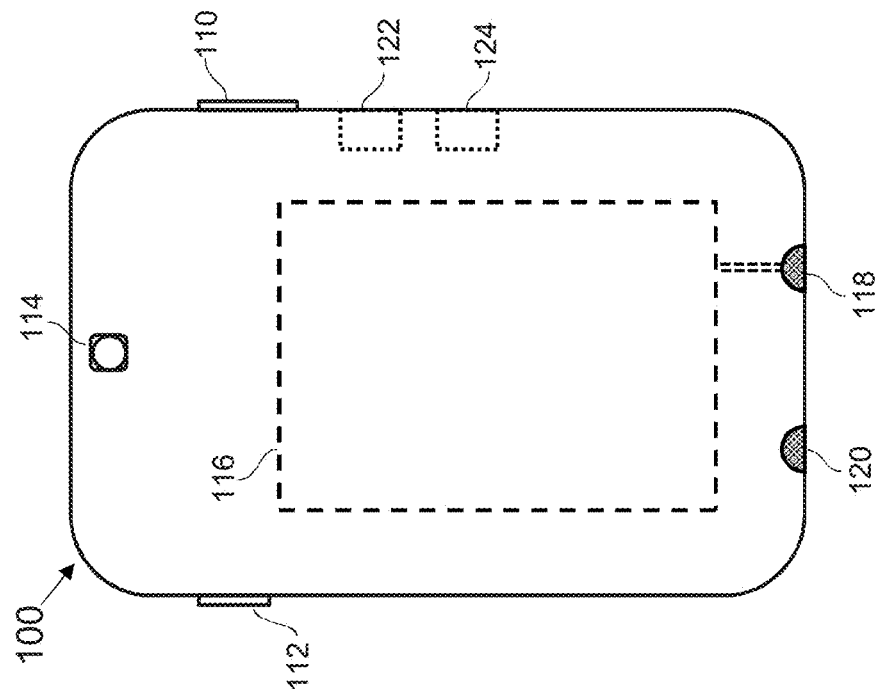
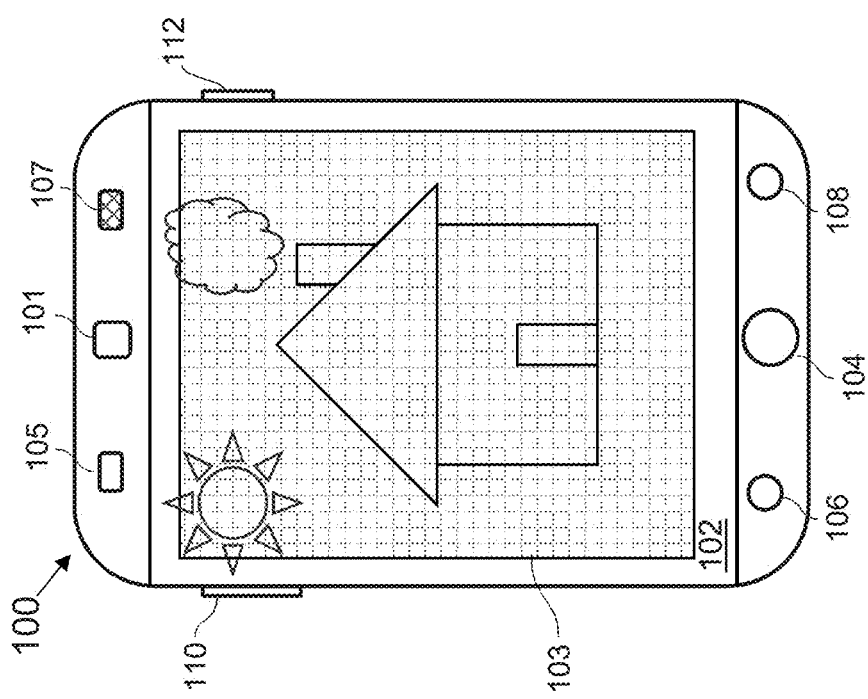

TOUCH SENSOR

CROSS-REFERENCE TO THE RELATED APPLICATION

This application claims priority to the United Kingdom Patent Application No. GB1702117.1, filed Feb. 9, 2017, the disclosure of which is incorporated herein by reference in their entirety.

FIELD OF THE INVENTION

The present disclosure relates to position-sensitive capacitive touch sensors, more especially, but not exclusively, to capacitive touch sensors integrated with displays to form touch screens.

BACKGROUND

A capacitive touch sensor, referred to simply as a touch sensor in the following, may detect the presence and location of a touch or the proximity of an object (such as a user's finger or a stylus) on a surface. Touch sensors are often combined with a display to produce a touch screen. For a touch screen, the most common display technologies currently are thin film transistor (TFT) liquid crystal displays (LCDs) and organic light emitting diode (OLED) displays. In other devices, the touch sensors are not combined with a display, e.g. a touch pad of a laptop computer. A touch screen enables a user to interact directly with what is displayed on the screen through a graphical user interface (GUI), rather than indirectly with a mouse or touch pad. A touch sensor may be attached to or provided as part of a mobile phone, tablet or laptop computer, for example.

Touch sensors may be classified into grid and matrix types. In a matrix type, an array of electrodes is arranged on the surface which are electrically isolated from each other, so that each electrode in the array provides its own touch signal. A matrix type touch sensor is therefore naturally suited to situations in which an array of touch-sensitive buttons is needed, such as in a control interface, data entry interface or calculator. In a grid type, there are two groups of parallel electrodes, usually referred to as X and Y electrodes, since they are typically arranged orthogonal to each other. A number of nodes are defined by the crossing points of pairs of X and Y electrodes (as viewed in plan view), where the number of nodes is the product of the number of X electrodes and Y electrodes. A grid type touch sensor is the type typically used for touch screens on mobile phones, drawing tablets and so forth. In earlier designs, the X and Y electrodes are arranged either side of a dielectric layer, so they are vertically offset from each other by the thickness of the dielectric layer, vertical meaning orthogonal to the plane of the layers. In more recent designs, to reduce overall thickness, the X and Y electrodes are deposited on the same side of a dielectric layer, i.e. in a single layer, with thin films of dielectric material being locally deposited at the cross-overs to avoid shorting between the X and Y electrodes. A single electrode layer design of this kind is disclosed in US 2010/156810 A1, the entire contents of which are incorporated herein by reference.

Touch sensors may also be classified into self capacitance and mutual capacitance types.

In a self capacitance measurement, the capacitance being measured is between an electrode under a dielectric touch panel and the touching finger, stylus etc., or more precisely the effect that the touch's increase in capacitance with the electrode has on charging a measurement capacitor that forms part of the touch IC's measurement circuit. The finger and the electrode can thus be thought of as acting as the plates of a capacitor with the touch panel being the dielectric.

In a mutual capacitance measurement, adjacent pairs of electrodes are arranged under the touch panel, and form the nominal plates of the capacitor. A touching body acts to modify the capacitance associated with the electrode pair by replacing what was the ambient environment, i.e. in most cases air, but possibly water or some other gas or liquid, with the touching object, which may be effectively a dielectric material (e.g. a dry finger, or a plastics stylus) or in some cases could be conductive (e.g. a wet finger, or a metal stylus). One of the pair of electrodes is driven with a drive signal, e.g. with a burst of pulses, and the other electrode of the pair senses the drive signal. The effect of the touch is to attenuate or amplify the drive signal received at the sense electrode, i.e. affects the amount of charge collected at the sense electrode. Changes in the mutual capacitance between a drive electrode and a sense electrode provide the measurement signal. It is noted that in a mutual capacitance grid sensor, there is a convention to label drive electrodes as the X electrodes and sense electrodes as the Y electrodes, although this choice is arbitrary. A perhaps clearer labelling that is often used is to label the drive electrodes as "Tx" for transmission and the sense electrodes as "Rx" for receiver in analogy to telecoms notation, although this labelling is of course specific to mutual capacitance measurements.

Current industry standard touch screens for mobile phones rely on operating the same touch sensor to make both self capacitance and mutual capacitance measurements, since acquiring both is beneficial to gaining additional information about the touch which can be used in post-processing to increase the reliability of interpretation. For example, mutual capacitance measurement have high noise immunity, whereas self capacitance measurements are easier to interpret and give a direct measure of moisture presence.

FIG. 1A is a schematic cross-section through a touch panel in a plane perpendicular to the plane of the stack showing a mutual capacitance measurement involving an individual pair of X (drive) and Y (sense) electrodes: X, Y. Electric field lines are shown schematically with the arrow-headed, curved lines.

FIG. 1B is a schematic cross-section through the same touch panel as FIG. 1A in the same plane showing a self capacitance measurement involving the same pair of X and Y electrodes: X, Y. Electric field lines are shown schematically with the arrow-headed lines.

In touch screen design, there is a continuing trend towards making the display and sensor stack thinner so the whole phone, tablet etc. can be as thin as possible. Generally, a thinner stack means that the display layers, in particular the display drive electrodes are brought closer to the touch sensor layers, in particular the touch sensor electrodes. There is also a desire to make the touch panel thinner, although this is motivated by a desire to reduce cost (since the touch panel material is expensive) or to provide for flexibility of the display stack.

A side effect of bringing the display ever closer to the touch sensor electrodes, is that there is ever larger self capacitance between the touch sensor electrodes and the display electrodes. An unwanted consequence of the proximity of the display electrodes to the touch sensor electrodes is signal inversion of poorly grounded touches in mutual capacitance measurements. When a touch is received from a finger or other touching object which is not well grounded to the system ground, this is referred to as a floating touch, as opposed to a grounded touch. A floating touch is defined as one having a low self capacitance to the system ground, and a grounded touch is defined as one having a high self capacitance to the system ground. In a mobile phone or other handheld device, the system ground may be constituted by the device chassis or housing, and/or by the display electrodes. If a user is holding the device, then the user, and hence his or her touches, can be expected to be well grounded. However, if the device is not being held, e.g. lying on a well insulated object such as a wooden desk top or a fabric car seat, then the device itself is electrically isolated, so grounding of a touch will be dependent on the touch being able to find a ground to the device itself.

A floating touch can cause an undesired increase in mutual capacitance between drive and sense electrodes in a touch sensor layer, instead of the usual, desired decrease. The sign of the touch signal is thus inverted. A concrete example has a touch sensor electrode configuration with co-planar X and Y electrodes arranged 0.12 mm above the display electrodes. The X and Y electrodes are both the same size at 6×3 mm and arranged adjacent to each other along their 6 mm sides separated by a gap of 0.135 mm. The touch panel thickness is 0.1 mm. All dielectric permittivities are taken to be 3.5 or 4.0 for the various dielectric layers including the touch panel. Other parameters are set to typical representative values. With this example, we find that when a grounded touch of 4 mm diameter touches the touch surface, then the mutual capacitance reduces to approximately half the no-touch value. More specifically, when there is a no-touch mutual capacitance of approximately 200 fF, which reduces to about 100 fF with the grounded touch. On the other hand, with a floating touch of the same size, the mutual capacitance increases to approximately 600 fF, i.e. increases to 3 times the no-touch value. In any given touch sensor and display combination, i.e. touch screen stack, simulations or testing can be used to determine, based on touch size and grounding state of the touch, whether the mutual capacitance change will be positive or negative. Because of its predictability and reproducibility, this effect can be dealt with in post-processing by the touch-sensor controller chip. A self capacitance measurement can be used to detect how well a touch is grounded, and this information can be used as an aid when analysing the mutual capacitance measurement data. However, in thin sensor and display stacks, the ability to carry out self capacitance measurements is compromised, since the proximity of the display electrodes to the touch sensor electrodes can lead to the capacitance between touching object and touch sensor electrode becoming much smaller than that between the display electrodes and the touch sensor electrodes. Consequently, there may be no accurate self capacitance measurements available to use as a post-processing aid to detecting signal inversion in the mutual capacitance measurements.

BRIEF SUMMARY OF THE INVENTION

According to one aspect of the disclosure, there is provided a device incorporating a capacitive touch sensor, the device comprising:

a touch panel having on an upper side a touch surface and on a lower side an internal surface, the touch panel being made of a dielectric material;

an X electrode layer accommodating a set of X electrodes arranged under the touch panel and extending in an x direction;

a Y electrode layer accommodating a set of Y electrodes arranged under the touch panel and extending in a y direction different from the x direction, such that the X and Y electrodes cross each other to form a two-dimensional array of nodes defining a touch sensitive area in which adjacent portions of the X and Y electrodes are separated by a gap 'G' suitable for making a mutual capacitance measurement of a touching object impinging on the touch surface; and a segmented conductive layer of conductive material embedded in the touch panel beneath the touch surface to pre-load the mutual capacitance between the adjacent portions of the X and Y electrodes of the sensor to the same or similar level of that of a floating touch of maximum size that it is desired to mitigate against, the segmented conductive layer comprising a plurality of segments of the conductive material which are separated by gaps 's'.

The segmented conductive or SC layer effectively pre-loads the mutual capacitance of the touch sensor to the same or similar level of that of a floating touch of the maximum size for which signal inversion is to be avoided. The provision of the SC layer allows thin touch panels to be used in particular for touch screens where there is a display that may be close to the touch sensor. For example, in embodiments, the touch panel may have a thickness of less than one of: 500, 400, 300, 200, 150 and 100 micrometers.

In touch screen embodiments, a display will be included which is configured to operate in conjunction with the capacitive touch sensor and thereby form a touch screen. The display, such as an LCD or OLED display, has electrode layers and is arranged such that the uppermost one of the display electrode layers is separated from the lower of the X and Y electrode layers by a distance of less than 600 micrometers, for example less than one of: 500, 400, 300, 200 and 100 micrometers. Here we note that in the special case of an in-cell stack in which the VCOM electrode layer also functions as the X electrode layer through time multiplexing, this dual function layer is considered to be the X electrode layer for the purposes of defining the X-electrode-to-uppermost-display-electrode separation distance.

There are various options for locating the segmented conductive layer in the stack. In some embodiments, the touch panel is subdivided into a coating layer having the touch surface on its upper side and underneath a structural layer, with the segmented conductive layer being arranged between the coating layer and the structural layer. In other embodiments, the segmented conductive layer is arranged under a structural layer of the touch panel and over a layer of dielectric material arranged above the X and Y electrode layers. In other embodiments, the segmented conductive layer is arranged directly under a structural layer of the touch panel. In other embodiments, a polarizer layer is arranged above the X and Y electrode layers, and the segmented conductive layer is arranged directly on one side of the polarizer layer.

The device design parameters, and particular its dimensions, can be selected such that, in a mutual capacitance measurement, a large area touch, such as one covering at least twenty-five contiguous array nodes, e.g. a 5×5 array, causes a change in mutual capacitance as measured between the X and Y electrodes of the same sign regardless of the ground condition of the touch. A suitable array size could be used to define a large touch, or even the whole array. The device design parameters, and particular its dimensions, can also or instead be selected in respect of a small touch. Namely, the dimensions of the device can be selected such that, in a mutual capacitance measurement, a small area touch, that is one covering an area less than an area defined by a quadrilateral of four adjacent array nodes, causes a change in mutual capacitance as measured between the X and Y electrodes of the same sign regardless of the ground condition of the touch.

The X and Y electrode layers of the touch sensor may together be formed as a single layer, or as separate layers with an intervening intermediate layer of a dielectric material.

A particular group of embodiments is based on an electrode pattern for the touch sensor electrodes in which higher order electrode branches interleave or interdigitate, and these interdigitating portions of the electrodes are what dominates the mutual capacitance. Specifically, the X electrodes comprise zeroth order branches extending in the x direction and the Y electrodes comprise zeroth order branches extending in the y direction. The zeroth order branches of the X and Y electrodes which cross each other and the zeroth order branches of any two adjacent X electrodes and any two adjacent Y electrodes enclose a sub-area. The X and Y electrodes each further comprise higher order branches of order n, each of which is confined to the sub-area into which it buds, where order n is a positive integer and where an nth order branch buds from an (n−1)th order branch, so that, away from edges of the node array, each node is associated with four sub-areas, and wherein, in each sub-area, at least some of the higher order X electrode branches have portions which co-extend with at least some of the higher order Y branches, where the co-extending X and Y portions are separated by a gap suitable for making a mutual capacitance measurement of a touching object impinging on the touch surface. An advantage of this kind of electrode pattern design is that the number of, size of, and gaps between, co-extending higher order X and Y branches, and in particular the number of interdigitating electrode branches between X and Y, can be selected freely as design parameters to arrive at an overall stack design that fulfills a specification that includes mitigation or prevention of signal inversion. Parameters to take account of include: touch panel thickness, distance between the segmented conductive layer, electrode pattern layers and if present display layers.

The segments of the conductive material represent a macrostructure of the segmented conductive layer. In some embodiments, the conductive material in each segment is continuous. In other embodiments, the conductive material of each segment has a microstructure formed of a mesh of the conductive material with micro-areas absent of the conductive material in the mesh.

According to another aspect of the disclosure, there is provided a method of manufacturing a device incorporating a capacitive touch sensor, the method comprising:

fabricating a touch panel having on an upper side a touch surface and on a lower side an internal surface, the touch panel being made of a dielectric material;

fabricating an X electrode layer accommodating a set of X electrodes arranged under the touch panel and extending in an x direction;

fabricating a Y electrode layer accommodating a set of Y electrodes arranged under the touch panel and extending in a y direction different from the x direction, such that the X and Y electrodes cross each other to form a two-dimensional array of nodes defining a touch sensitive area in which adjacent portions of the X and Y electrodes are separated by a gap 'G' suitable for making a mutual capacitance measurement of a touching object impinging on the touch surface; and fabricating a segmented conductive layer of conductive material embedded in the touch panel beneath the touch surface to pre-load the mutual capacitance between the adjacent portions of the X and Y electrodes of the sensor to the same or similar level of that of a floating touch of maximum size that it is desired to mitigate against, the segmented conductive layer comprising a plurality of segments of the conductive material which are separated by gaps 's'.

BRIEF DESCRIPTION OF THE DRAWINGS

In the following, the present invention will further be described by way of example only with reference to exemplary embodiments illustrated in the figures.

FIG. 3 is a schematic cross-section through a capacitive touch sensor according to one embodiment including a segmented conductive layer.

FIG. 4 is a schematic cross-section through a capacitive touch sensor according to another embodiment including a segmented conductive layer.

FIGS. 12A and 12B are schematic drawings in plan view of one embodiment.

FIG. 18 shows a sensor and display stack of a hybrid in-cell OLED embodiment of the disclosure.

FIG. 19 shows a sensor and display stack of another hybrid in-cell OLED embodiment of the disclosure.

FIG. 20A is a schematic view of the front of a handheld touch screen computing device according to embodiments of the disclosure.

FIG. 20B is a schematic view of the rear of the handheld touch screen computing device of FIG. 20A.

DETAILED DESCRIPTION OF THE PREFERRED EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

We now discuss the phenomenon of signal inversion of poorly grounded touches in more detail in relation to a standard capacitive touch sensor arrangement.

Figure 1A:
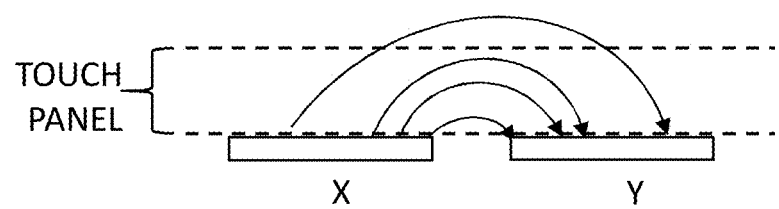
FIG. 1A is a schematic cross-section through a touch panel showing the electric field distribution during a mutual capacitance measurement.
Figure 1B:
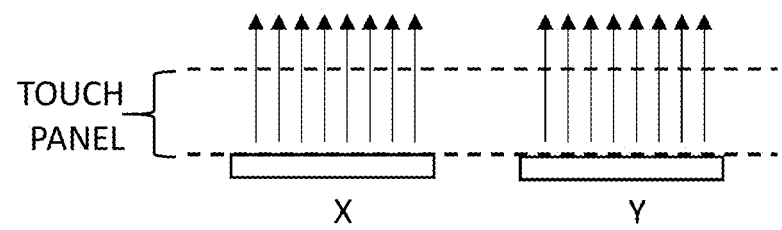
FIG. 1B is a schematic cross-section through the same touch panel as FIG. 1A showing the electric field distribution during a self capacitance measurement.
Figure 2A:
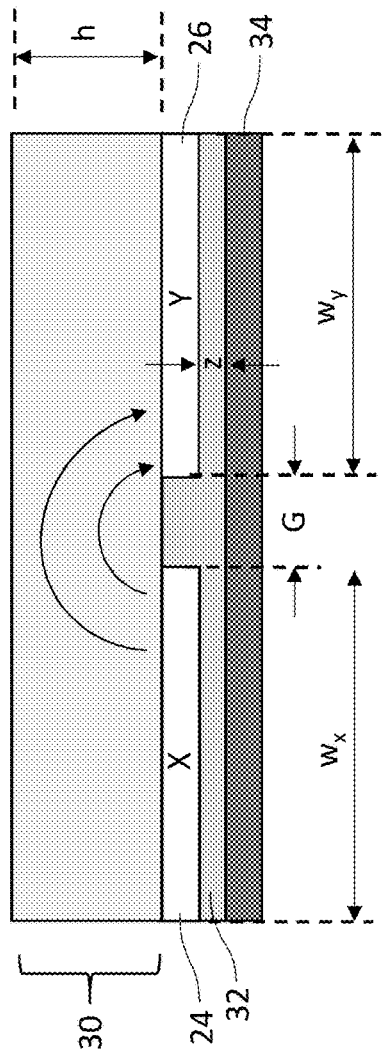
FIG. 2A is a schematic cross-section through a capacitive touch sensor of a touch screen showing the electric field distribution during a mutual capacitance measurement when there is no touch.

FIG. 2A is a schematic cross-section through a capacitive touch sensor of a touch screen showing the electric field distribution during a mutual capacitance measurement when there is no touch. A touch panel 30 of thickness 'h' has an upper side facing a touch surface and on a lower side which is an internal surface bonding to the layers below. The touch panel 30 is made of a dielectric material. An X electrode layer accommodating a set of X electrodes 24 (an example portion of one of which is shown) is arranged under the touch panel 30. A Y electrode layer accommodating a set of Y electrodes 26 (an example portion of one of which is shown) is arranged under the touch panel 30. Adjacent portions 24, 26 of the X & Y electrodes, of widths Wx and Wy respectively, co-extend (out of the plane of the drawing) separated by a gap 'G' suitable for making a mutual capacitance measurement of a touching object impinging on the touch surface. As shown by the schematic field lines, the mutual capacitance field is tightly coupled in the region of the gap between the X and Y electrodes 24, 26. The X & Y electrodes 24 and 26 are embedded in a dielectric layer 32, which is on top of the display 34 including the display's electrodes. The vertical separation of the touch sensor electrodes 24, 26 and the display electrodes 34 through the dielectric layer 32 is 'z'.

Figure 2B:
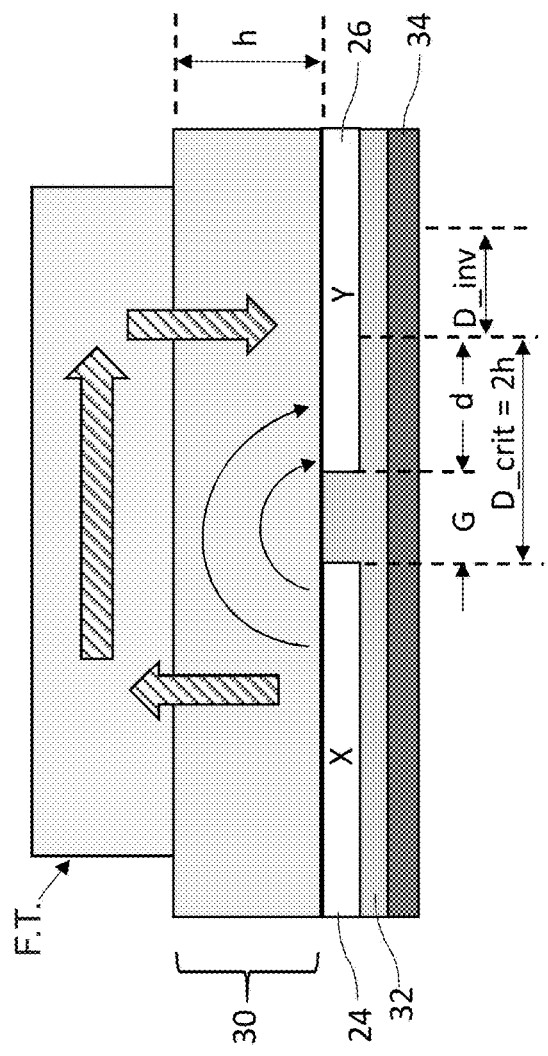
FIG. 2B is a schematic cross-section through a capacitive touch sensor of a touch screen showing the electric field distribution during a mutual capacitance measurement when there is a floating touch.

FIG. 2B shows the same structure as FIG. 2A but with a floating touch, labelled F.T., impinging on the touch surface. The floating touch has a high relative permittivity $\varepsilon_r$ and high conductivity, which causes portions of the X and Y electrodes which are far away from the gap region to become highly coupled through the touching body, thereby dramatically increasing the mutual capacitance between paired X and Y electrodes. This strong coupling is illustrated schematically by the three hatched thick arrows. The phenomenon of signal inversion can be understood in a simple geometric way by treating the touching body as providing a zero path length path between the drive and sense electrodes, so that a critical distance can be defined when the vertical path length up from the drive electrode to the touching body and then down from the touching body to the sense electrode, i.e. twice the touch panel thickness 'h', is equal to the lateral distance 'D_crit' between an element of a touching body on the drive electrode and the sense electrode. Lateral distance 'G' is the electrode gap as already discussed and lateral distance 'd' is defined as the difference between twice the touch panel thickness and the electrode gap, i.e. d=2h−G. Mutual capacitance signal contributions at points on the sense electrode that lie at greater lateral distances than the critical distance from the nearest edge of the drive electrode produce a positive contribution to mutual capacitance. Once the touch extends far enough across the sense electrode, another stage is reached where the overall mutual capacitance becomes equal to the no-touch value. We label the distance between the critical distance and this inversion distance as 'D_inv' which for a wide variety of simulations and testing typically is in the range of between a half and the same magnitude as the critical distance. At this point, the effect of a floating touch extends by a distance d+D_inv into the sense electrode from the direction of the paired drive electrode, it being noted that the radiating field of a floating touch may extend somewhat beyond the touch itself. In other words, the mutual capacitance between the touch and the sense electrode may have contributions from slightly beyond the area of the physical touch. Beyond this distance, the mutual capacitance signal is larger than the no-touch value, which is referred to as signal inversion. The signal inversion region can be explained as being the region in which mutual capacitance between X and Y electrodes has increased by more than the charge 'stolen' by the self capacitance of the touch to the display. The critical distance and the inversion distance where cross-over occurs to signal inversion, will vary depending on the distance between touch sensor electrodes and the display, in particular the layers of the display that provide a ground, i.e. principally the display electrodes.

Having now described the phenomenon of signal inversion, we now describe embodiments which completely avoid signal inversion occurring, at least for a particular touch specification, e.g. size of touch, or at least counteract signal inversion components, so that even if it occurs the magnitude of the inverted signal from floating touches is kept within a similar magnitude to the non-inverted signal from grounded touches.

FIG. 3 is a schematic cross-section through a capacitive touch sensor according to one embodiment. The sensor has similar overall structure to a conventional sensor as described above in relation to FIGS. 2A and 2B, and we use the same reference signs to label like parts and features. As illustrated, sensor of FIG. 3 differs in that a segmented conductive layer 40 is provided and embedded in the touch panel 30 between the touch sensor electrode layer(s) and the touch surface, namely at a distance 'c1' from the touch surface and 'c2' from the sensor electrodes 24, 26. The segmented conductive layer 40 comprises a plurality of segments 42 of conductive material which are separated by gaps of lateral dimension 's', so that they are electrically isolated from each other, and also other conductive components of the stack—in particular the drive and sense electrodes of the touch sensor. The segmentation can be realised in a wide variety of patterns. The segmented conductive layer effectively pre-loads the mutual capacitance of the sensor to the same or similar level of that of a floating touch, or more specifically to a floating touch of maximum size that it is desired to mitigate against. In this particular embodiment, the segmented conductive layer 40 is embedded between an anti-scratch hard coating layer of thickness 'c1' and the plastics material or glass which forms the principal touch panel layer. The distance 'c2' between the segmented conductive layer 40 and the (uppermost) touch sensor electrodes is an important design parameter. In many example implementations, the distance 'c2' may be varied between 10 and 100 micrometers, in particular 25 to 75 micrometers, although other distances are possible. The segmented conductive layer 40 is thus just under the touch surface, since the thickness 'c1' of the hard coating layer will typically only be of the order of 10 μm. In various example implementations, the electrode portions that contribute principally to mutual capacitance are interdigitated, and have widths in the range 50 to 1000 micrometers, in particular 100 to 600 micrometers. In other example implementations, the electrode portions that contribute principally to mutual capacitance are electrode pads (see US 2010/156810 A1 for example which shows a diamond pattern) and have widths in the range 2 mm to 10 mm. In example implementations, the gap 'G' between those paired drive and sense electrodes or electrode portions that contribute principally to mutual capacitance is in the range 50 to 300 micrometers, in particular 100 to 200 micrometers.

For display applications, the conductive layer needs to be clear, i.e. transparent to the wavelengths emitted by the display, i.e. typically the visible wavelength range. The conductive layer should also be patterned uniformly such that it does not adversely obscure images being displayed on a display screen, and to avoid the pattern being highly visible in reflection. Indium tin oxide (ITO) is a good candidate material for the segmented conductive layer. Here we note that, unlike an electrode layer, the segmented conductive layer does not require a low ohms/square value of conductivity, so the fact that ITO has relatively low conductance is not relevant. In other words, an ITO segmented conductive layer can be made thin, for example less than 1 μm, thereby reducing its refractive index mismatch with the rest of the sensor stack and reducing visibility artifacts, as well as making it inexpensive and meaning that it does not appreciably add to stack thickness.

The patterned conductive layer forms a layer of high relative permittivity '$\varepsilon_r$', where the effective relative permittivity value is a function of the area of the patterned segments 42 and the gaps 's' (isolation cuts) between them.

The mutual capacitance preloading of the sensor is a function of the effective $\varepsilon_r$ of the segmented conductive layer (relative to the other layers in the stack) and its distance from the touch sensor electrodes and the display electrodes.

The segmented conductive geometry is optimized to provide mitigation of floating touch sizes (of a given value of self capacitance) for a minimum increase in mutual capacitance between electrodes compared to what the mutual capacitance would be without the segmented conductive layer.

By including the patterned conductive layer, it is possible to design stacks which have full mitigation of signal inversion for touch panel thicknesses of less than 150 μm or 100 μm. The presence of the segmented conductive layer also has the beneficial side effect of increasing grounded touch sensitivity. Including the segmented conductive layer also has no significant impact on stack thickness. Including the segmented conductive layer does not complicate the electrical design, since the conductive segments 42 are passive, not being connected to each other or to any tracking. The conductive segments should also be tolerant to bending, which may be important in thin flexible stack applications.

As mentioned above, when designing a touch panel according to the teachings herein disclosed, the degree of signal inversion mitigation should be specified. For example, is the aim to completely preclude signal inversion for a touch of any size, i.e. from a small point touch to a touch that covers the whole touch sensitive area, or merely to preclude signal inversion for touches up to a certain size, or only for very large area touches? Alternatively, is the aim not to avoid signal inversion, but rather only partly offset its effects so that very large magnitudes of inverted signals do not arise, e.g. no bigger than the non-inverted signal magnitudes? One example specification would be to ensure the device dimensions are selected such that, in a mutual capacitance measurement, a large area touch, e.g. one covering at least twenty-five contiguous array nodes, will cause a change in mutual capacitance as measured between the X and Y electrodes of the same sign regardless of the ground condition of the touch. Another example specification would be to ensure the device dimensions are selected such that, in a mutual capacitance measurement, a small area touch, that is one covering an area less than an area defined by a quadrilateral of four adjacent array nodes, causes a change in mutual capacitance as measured between the X and Y electrodes of the same sign regardless of the ground condition of the touch. The touch area against which the design is specified may be in absolute terms, e.g. to correspond to the size of a finger touch (e.g. 4, 5, 6, 7, 8, 9, 10, 11, 12, 13, 14 or 15 mm diameter circle), or a touch by another touching body (e.g. stylus, brush) with which the device is designed to operate. The specification could also include a definition of the floating touch being considered, e.g. in terms of its self capacitance value to the display.

FIG. 4 is a schematic cross-section through a capacitive touch sensor according to another embodiment including a segmented conductive layer. The same reference signs are used to label like parts. The embodiment of FIG. 4 differs from that of FIG. 3 in that the segmented conductive layer is arranged at a greater distance 'c1' beneath the touch surface. This results from the fact that in this particular embodiment, the segmented conductive layer 40 is arranged under the plastics material or glass of thickness 'c1' which forms the principal touch panel layer and also any hard coating layer (not separately shown) and on top of another dielectric layer (not shown) of thickness 'c2', which may be a layer specifically provided to separate the segmented conductive layer from the touch sensor electrode layer (or the uppermost touch sensor electrode layer if they are not in a single layer). Alternatively, this dielectric layer may be a layer already provided for some other purpose, e.g. a polariser layer.

Figure 5A:
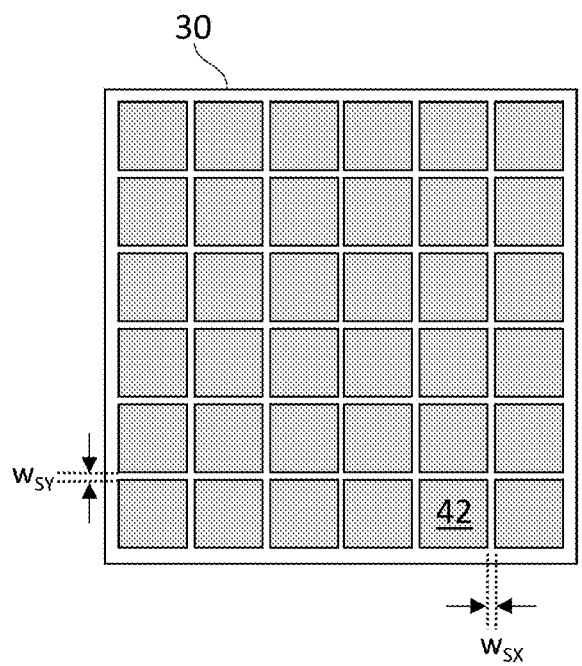
FIG. 5A is a schematic plan view of the segmented conductive layer of FIG. 3 or FIG. 4.

FIG. 5A is a schematic plan view of the segmented conductive layer 40 of FIG. 3 or FIG. 4. Embedded in the touch panel 30, each segment 42 is made of a continuous sheet of conductive material, e.g. ITO, PEDOT:PSS (poly (3,4-ethylenedioxythiophene)polystyrene sulfonate), carbon nanotubes, or graphene. Each segment is square. Each segment is separated from its adjacent segment by a gap s, which is of width $W_{SX}$ and $W_{SY}$ in the x and y directions respectively. The values of $W_{SX}$ and $W_{SY}$ may conveniently be set equal, but could be different. In the illustration, the segments are square, but any patterning is possible, since it is the electrical properties of the segments that are important, and there is design freedom over their individual shapes and form of tessellation. The segments need not all be the same size or shape. The pattern need not be geometric, and could be fractal for example. The gaps between segments in the segmented conductive layer may have widths of between 10 and 1000 micrometers, for example. Very small widths may add to manufacturing costs, so a width of at least 10, 20, 30, 40, 50, 60, 70, 80, 90 or 100 micrometers may be desirable in some cases. Typical widths for many embodiments will be in the range 20 to 100 micrometers. The segment areas of individual segments may be varied widely in different embodiments. Several embodiments have segment areas of less than one square millimeter.

Figure 5B:
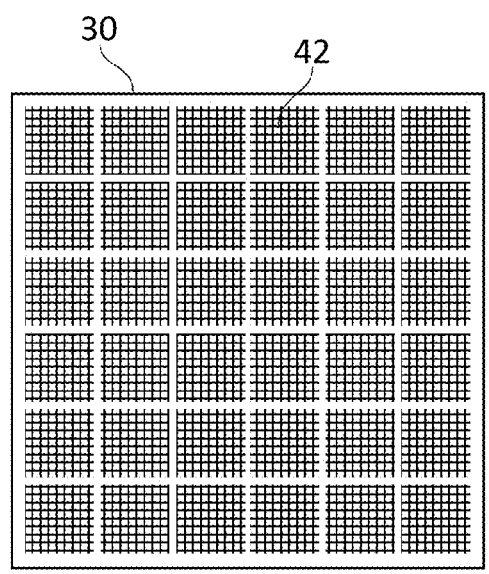
FIG. 5B is a schematic plan view of a variant of FIG. 5A.

FIG. 5B is a schematic plan view of a variant of FIG. 5A. Instead of being made of continuous sheets of conductive material, the segments 42 have a microstructure formed of a mesh of the conductive material with micro-areas absent of the conductive material in the mesh. It will be appreciated though that the overall pattern of the segmented conductive layer embedded in the touch panel 30 has the same macrostructure as in FIG. 5A. Generally, mesh could be applied to any given macrostructure as an alternative to solid sheets of conductive material.

Figure 6:
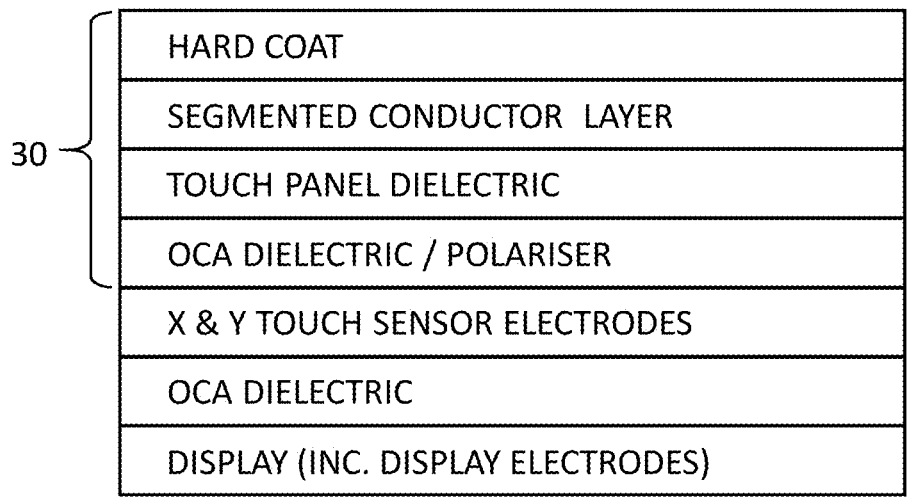
FIG. 6 shows the stack configuration of FIG. 3.

FIG. 6 shows the stack configuration of FIG. 3. The stack starts with the display followed by a layer of optically clear adhesive (OCA). There then follow the touch sensor electrodes as a single layer. (It will be appreciated that the X and Y electrodes could alternatively be in distinct layers separated by a dielectric layer.) A further OCA layer follows before the touch panel glass or plastics layer. The segmented conductive layer is then arranged on the touch panel layer under the top, hard coat of anti-scratch material. For display applications, a polariser will typically be provided, and it is beneficial to locate the polariser above the touch sensor electrodes to help obscure them. The upper of the two OCA layers, could therefore be substituted with a polariser layer. (It would also be possible to substitute the lower of the two OCA layers with a polariser.) In the following table, we present some specific properties and thickness of one example for a stack as illustrated in FIG. 6, where SC refers to segmented conductive, TP to touch panel and PET to polyethylene terephthalate.

| LAYER (MATERIAL) | PROPERTIES | THICKNESS |
|---|---|---|
| Hard Coat | $\varepsilon_r = 5$ | ~10 μm |
| SC layer (ITO) | 1000 ohms/square | <1 μm |
| TP (PET) | $\varepsilon_r = 4$ | 0.1 to 0.3 mm |
| OCA1 | $\varepsilon_r = 3.5$ | 0.05 mm |
| Electrodes (ITO) | solid | <1 μm |
| OCA2 | $\varepsilon_r = 3.5$ | 0.12 mm |
| Display | | as provided |

Figure 7:
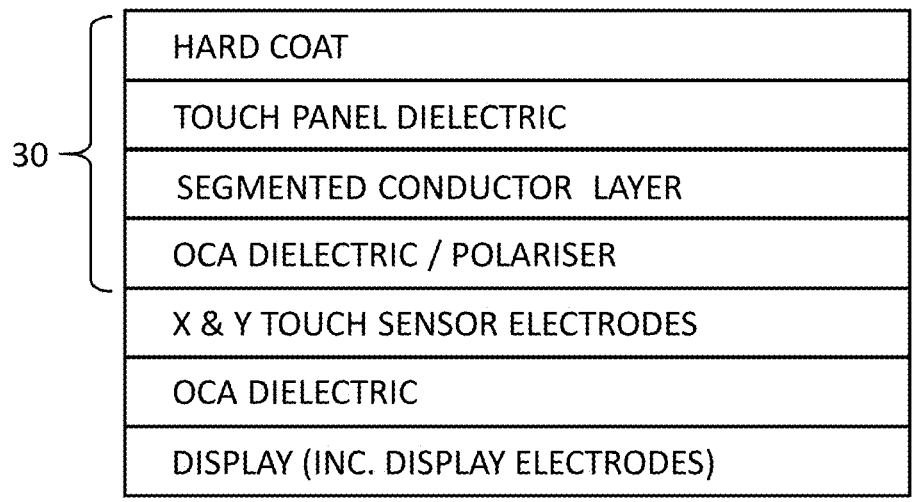
FIG. 7 shows the stack configuration of FIG. 4.

FIG. 7 shows the stack configuration of FIG. 4 in which the segmented conductive layer is arrange under the touch panel layer. Apart from this change in stack sequence, the stack configuration is the same, and the same example materials, properties and thicknesses can be used as in the table above.

Figure 8:
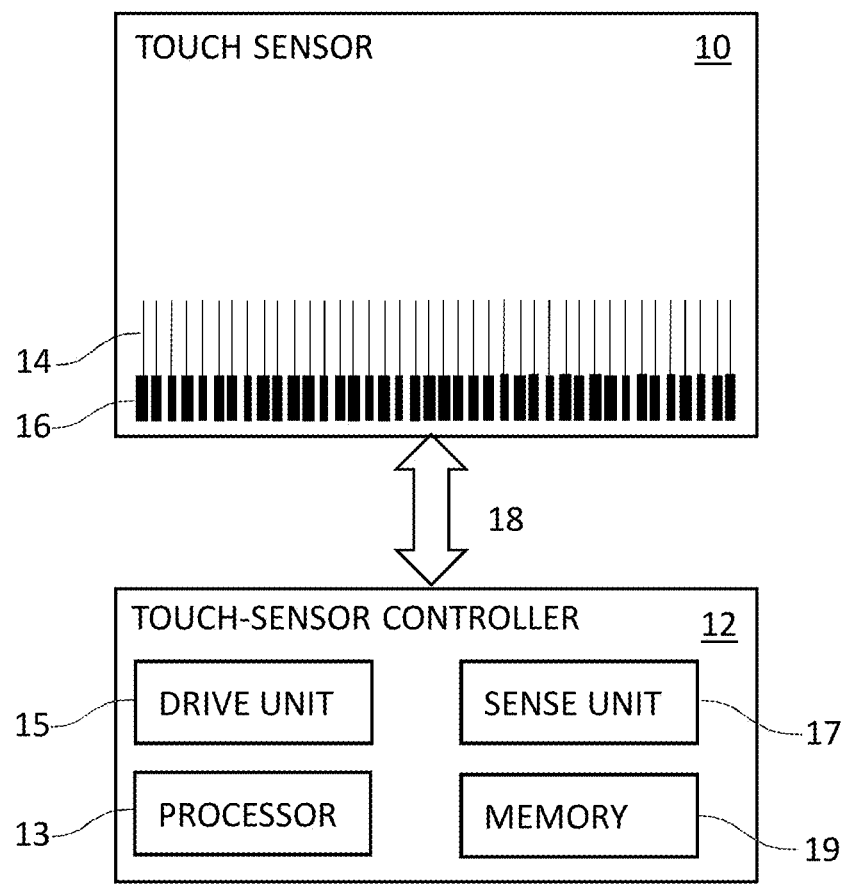
FIG. 8 illustrates an example touch sensor with an example controller.

FIG. 8 illustrates an example touch sensor 10 with an example touch-sensor controller 12, often referred to in the art as a touch integrated circuit (touch IC) or touch sensor/screen controller/chip (TSC). The touch sensor 10 and the touch-sensor controller 12 may detect the presence and location of a touch or the proximity of an object within a touch-sensitive area of the touch sensor 10. The touch sensor 10 may include one or more touch-sensitive areas. The touch sensor 10 may include an array of electrodes which may be arranged in a single layer or multiple layers. The electrode array will usually be of a conductive material, each layer of which is deposited on a dielectric material that forms a substrate, e.g. for support and/or to provide a suitable deposition surface.

Each electrode may be an area of conductive material of a desired topographic form. As an example and not by way of limitation, an electrode may be made of indium tin oxide (ITO), which is chosen for display applications, since it is transparent in the visible region. The proportion of the electrode area covered by conductive material may vary depending on the design, this percentage being sometimes referred to in the art as the fill percentage. As an example and not by way of limitation, an electrode may be made of metal or metallic material or other conductive material such as for example copper, silver, or a copper- or silver-based material or silicide. The necessary fine structure to produce a desired topography in metal is sometimes referred to as fine line metal (FLM). The conductive material may be fine-meshed in addition to its topographic form where the holes in the mesh are sized and arranged to coincide in a direction perpendicular to the plane of the touch sensor with underlying light emitters of a display, such as an OLED display. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fill percentages having any suitable patterns which fulfill a specification.

In embodiments of the disclosure, the touch sensor is fabricated as a laminar structure comprising a number of layers which are deposited or otherwise fabricated in a particular sequence. The layered structure is referred to in the art as a stack. In touch screen embodiments, the stack may further include display layers to provide an integrated display and touch sensor, i.e. an integrated touch screen. Alternatively, a touch screen may be fabricated from a sensor stack and a display stack, wherein the two stacks are unified in some suitable way as independent sub-assemblies, e.g. by a suitable bonding. The stack may comprise a substrate (or multiple substrates) and the conductive material forming the electrodes of the touch sensor 10.

The layers of a display stack enable a display screen to produce a colour or monochromatic image. The number, type and juxtaposition of layers depends on the type of display screen. For example, an LCD will have different layers and layer sequences than an OLED display. To form a touch screen, a touch sensor is typically placed over the display stack, either integrated as one stack or as two separate stacks which are arranged together after their respective manufacture.

As an example and not by way of limitation, the stack may include a first layer of optically clear adhesive (OCA) beneath a touch panel of a display stack. The touch panel may be clear and made of a resilient material suitable for repeated touching, such as for example a glass material, or a plastics material. Suitable glasses are from the alkali aluminosilicate family. Suitable plastics materials include polycarbonate (PC) and polymethyl methacrylate (PMMA). This disclosure contemplates any suitable touch panel made of any suitable material. The first layer of OCA may be disposed between a layer or substrate of the display stack and the substrate with the conductive material forming the electrodes. The substrate with the conductive material may provide a benefit or feature in producing an image (e.g., it may be a layer or substrate found in a typical, non-touch, display stack) or it may be a layer added specifically to provide a substrate on which the electrodes are formed. In some embodiments, the stack may also include a second layer of OCA. In some embodiments, the stack may also include a dielectric layer (which may be made of polyethylene terephthalate (PET) or another suitable material, similar to the substrate with the conductive material forming the electrodes). As an alternative, where appropriate, a thin coating of a dielectric material may be applied instead of the second layer of OCA and/or the dielectric layer. The second layer of OCA may be disposed between the substrate with the conductive material making up the electrodes and the dielectric layer, and the dielectric layer may be disposed between the second layer of OCA and another layer of the display stack. As an example only and not by way of limitation, the touch panel may have a thickness of approximately 0.10 to 1 mm; the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm. Although this disclosure describes particular example stacks with particular layers and orders of layers made of particular materials and having particular thicknesses, this disclosure contemplates any suitable stack with any suitable number of any suitable layers made of any suitable materials and having any suitable thicknesses.

In particular embodiments, the electrodes of the touch sensor 10 may be made of ITO in whole or in part. In particular embodiments, the electrodes of the touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

In a self capacitance implementation or mode of use, the touch sensor 10 has an array of electrodes of a single type that each singly forms a capacitive node. When an object touches or comes within proximity of the capacitive node, a change in self capacitance may occur at the capacitive node and the touch-sensor controller 12 may measure the change in capacitance, for example, as a change in the amount of charge needed to raise the voltage at the capacitive node by a pre-determined amount. As with a mutual capacitance implementation, by measuring changes in capacitance throughout the array, the touch-sensor controller 12 may determine the position of the touch or proximity within the touch-sensitive area(s) of the touch sensor 10.

In a mutual capacitance implementation or mode of use, the touch sensor 10 has an array of electrodes of at least two different types for drive and sense respectively, which cross each other (in plan view) to form an array of capacitive nodes. A given pair of drive and sense electrodes forming a capacitive node cross each other without making electrical contact, but with capacitive coupling across a solid dielectric situated between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of the touch sensor 10. In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines, although other angles of crossing are possible. Herein, reference to a drive line may encompass one or more drive electrodes making up the drive line. Similarly, reference to a sense line may encompass one or more sense electrodes making up the sense line.

It will be further understood that a particular touch sensor 10 may be operable in both self capacitance and mutual capacitance modes using the same electrodes, wherein the touch-sensor controller 12 is configured to switch between these modes as desired.

To enable mutual capacitance measurements to be made, the touch sensor 10 has two types of electrodes (e.g. X and Y) formed in a grid pattern on either side of a dielectric or on one side of a dielectric. A pair of electrodes, one from each type, capacitively coupled to each other across a space between them may form a capacitive node. For a self capacitance implementation, both types of electrode are generally used (although in principle a self capacitance measurement could be made with only a single type). For example, to carry out a self capacitance measurement, all the X and Y electrodes can be driven to a certain potential and then discharged through an analog integrator. Each pin has a tristate output architecture and an analog integrator (or a connection to allow each pin to be multiplexed to an analog integrator), with the states being: drive, float, switch to integrator, measure and discharge. The same touch sensor is therefore able to operate in both mutual capacitance and self capacitance modes.

Where the electrodes of the two different types cross (as viewed in plan view) and hence come nearest to each other a capacitive node is formed. Where they cross, the electrodes do not make electrical contact with each other, but are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of the touch sensor 10 may indicate a touch or proximity input at the position of the capacitive node. The touch-sensor controller 12 may detect and process the change in capacitance to determine the presence and location of the touch or proximity input. The touch-sensor controller 12 may then communicate information about the touch or proximity input to one or more other components (such one or more central processing units (CPUs)) of a device that includes the touch sensor 10 and the touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

In particular embodiments, the touch-sensor controller 12 comprises analogue circuitry, digital logic, and digital volatile or non-volatile memory. The touch-sensor controller 12 may include one or more integrated circuits (ICs), such as for example general-purpose microprocessors, microcontrollers, programmable logic devices or programmable logic arrays (PLAs), or application-specific ICs (ASICs). The memory of the touch-sensor controller 12 may be a random access memory (RAM), a read-only memory (ROM), an erasable programmable read-only memory (EPROM or Flash memory), a static random access memory (SRAM), and any suitable combination of the foregoing. The touch-sensor controller 12 may be programmed with computer readable program instructions which can be downloaded from a computer readable storage medium or an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The touch-sensor controller 12 comprises electronic circuitry and may be programmed, for example, with programmable logic circuitry, field-programmable gate arrays (FPGA), or programmable logic arrays (PLA) which may execute the computer readable program instructions by utilizing state information of the computer readable program instructions to personalize the electronic circuitry, in order to perform aspects of the present disclosure.

In particular embodiments, the touch-sensor controller 12 is disposed on a flexible printed circuit (FPC) bonded to the substrate of the touch sensor 10. The FPC may be active or passive, where appropriate. In particular embodiments, multiple touch-sensor controllers 12 are disposed on the FPC. The touch-sensor controller 12 may include a processor 13, a drive unit 15, a sense unit 17, and a memory 19. The drive unit 15 may supply drive signals to the drive electrodes of the touch sensor 10 for making mutual capacitance measurements. The sense unit 17 may sense charge at the capacitive nodes of the touch sensor 10, in both mutual and self capacitance measurements, and provide measurement signals to the processor 13 representing capacitances at the capacitive nodes. The processor 13 may control the supply of drive signals to the drive electrodes by the drive unit 15 and process measurement signals from the sense unit 17 to detect and process the presence and location of a touch or proximity input within the touch-sensitive area(s) of the touch sensor 10. The processor 13 may also follow changes in the position of a touch or proximity input within the touch-sensitive area(s) of the touch sensor 10. The memory 19 may store programming for execution by the processor 13, including programming for controlling the drive unit 15 to supply drive signals to the drive electrodes, programming for processing measurement signals from the sense unit 17, and other suitable programming, where appropriate. Although this disclosure describes a particular touch-sensor controller having a particular implementation with particular components, this disclosure contemplates any suitable touch-sensor controller having any suitable implementation with any suitable components.

On a substrate of the touch sensor 10, a plurality of tracks 14 of conductive material are disposed to couple each of the X and Y electrodes of the touch sensor 10 to connection pads 16, which are disposed on a substrate of the touch sensor 10. The connection pads 16 facilitate coupling of the tracks 14 (and hence X and Y electrode lines) to the touch-sensor controller 12. The tracks 14 may extend into or around (e.g. at the edges of) the touch-sensitive area(s) of the touch sensor 10. A particular subset of the tracks 14 may provide drive connections for coupling touch-sensor controller 12 to drive electrodes of the touch sensor 10, through which the drive unit 15 of touch-sensor controller 12 may supply drive signals to the drive electrodes. Other tracks 14 may provide sense connections for coupling touch-sensor controller 12 to sense electrodes of the touch sensor 10, through which the sense unit 17 of touch-sensor controller 12 may sense charge at the capacitive nodes of the touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of the touch sensor 10 (similar to tracks 14).

The connection pads 16 may be located along one or more edges of the touch sensor 10, outside the touch-sensitive area(s). As described above, the touch-sensor controller 12 may be on an FPC. The connection pads 16 may be made of the same material as the tracks 14 and may be bonded to the FPC using an anisotropic conductive film (ACF). The connection 18 may include conductive lines on the FPC coupling the touch-sensor controller 12 to the connection pads 16, in turn coupling the touch-sensor controller 12 to the tracks 14 and to the electrodes of the touch sensor 10. This disclosure contemplates any suitable form or type of connection 18 between the touch-sensor controller 12 and the touch sensor 10.

Figure 9A:
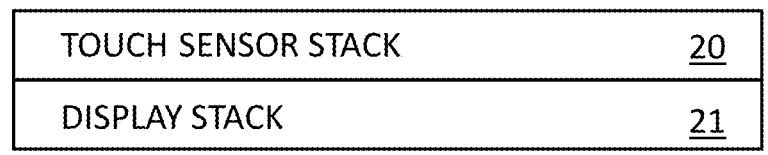
FIG. 9A illustrates a block diagram of an on-stack touch screen where the layers associated with the sensor function are physically separate from and functionally independent of the layers associated with the display function.

FIG. 9A illustrates a block diagram of an on-stack touch screen in accordance with particular embodiments comprising a touch sensor stack 20 arranged on a display stack 21. In an on-stack design, the layers associated with the sensor function are physically separate from and largely electrically functionally independent of the layers associated with the display function (although there will inevitably be some capacitive coupling of the touch sensor to conductive parts of the display stack, principally the TFT drive electrodes).

Figure 9B:
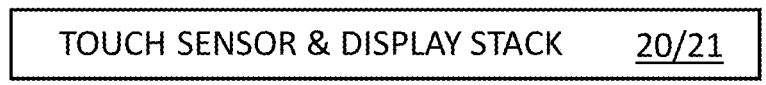
FIG. 9B illustrates a block diagram of an in-cell touch screen where the layers associated with the sensor function and display function are interleaved and/or shared.

FIG. 9B illustrates a block diagram of an in-cell touch screen in accordance with particular embodiments comprising a combined touch sensor and display stack 20, 21. In an in-cell design, the layers associated with the sensor function and display function are interleaved and/or shared.

The display stack 21 may comprise a plurality of layers configured to generate a colour image. The type and number of layers within the display stack 21 may vary depending on the type of display stack and/or the intended application of the display stack 21. For example, an LCD display stack 21 will typically require at least two polarisers above and below the liquid crystal layer, whereas an OLED display stack 21 does not require a polariser, but may include one or two. Each layer may comprise a particular feature or characteristic used in a display stack 21 for generating an image. These layers may in some embodiments, be configured to provide a colour image. Particular embodiments contemplate the display stack 21 comprising any number and/or type of layers for any type of display. In some embodiments, the display stack 21 may be a flexible display stack. In some embodiments, the display stack 21 may be curved over one or more parts of its surface (e.g. Samsung Galaxy Edge (trade mark) mobile telephone) or over its whole surface (e.g. large screen television). In still further embodiments, the display stack 21 may be flexible so that it can be flat or adopt a variety of complex curves depending on its environment. It is noted that for non-flat stacks, references to x and y or X and Y should be interpreted to lie in the plane of the stack layers, even if the plane is curved or otherwise non-planar in real space.

One or more components of the touch sensor 10 may be integrated into the display stack 21 in any of a variety of different ways, depending on operational needs or the particular embodiment. The touch sensor 10 may be located in any of a variety of different locations within the display stack 21. The location of the touch sensor 10 may vary depending on the type of the display stack 21 (e.g., an LCD display, OLED display, e-ink display etc.). For example, in an LCD display in which display stack 21 includes at least two polarisers, the touch sensor 10 may be positioned within the display stack 21 so as to not alter the polarisation of the light. For example, in an LCD display stack 21, if the touch sensor 10 includes a substrate made of a birefringent material, then the touch sensor 10 is not arranged between the LCD's two polarisers, but rather above them in the display stack 21. If the touch sensor 10 includes a substrate made of a non-birefringent material, the touch sensor 10 may be positioned between the polarisers of the display stack 21. On the other hand, in an OLED display stack 21, it may not matter whether or not the touch sensor 10 includes a layer of birefringent material, so there is more design freedom to arrange the touch sensor layers where desired, e.g. some of the touch sensor layers interleaved with (or combined with) layers of the display stack 21. For example, in some embodiments the touch sensor 10 may use an existing layer (e.g., a layer found in a typical non-touch display stack, such as the colour filter layer or one of the polariser layers, etc.) of the display stack 21 as a substrate.

The touch sensor 10 may be similar to, and comprise similar components and functionality as, the touch sensor 10 described above with respect to FIG. 8. Depending on the embodiment, and/or operational needs, the touch sensor 10 may be a laminated layer within the display stack 21, or one or more of the components of the touch sensor 10 (e.g., fine line metal electrodes for sensing a touch input) may be deposited on an existing layer of the display stack 21. This may allow the touch sensing functionality to be included during the manufacturing of the display stack 21. In embodiments in which the touch sensor 10 is deposited on an existing layer of the display stack 21, the existing layer of the display stack 21 may function as the substrate for the touch sensor 10. In other embodiments, the touch sensor 10 may comprise its own substrate that is placed within the display stack 21. Depending on the type of display and/or the desired location of the touch sensor 10 within display stack, the substrate used for the touch sensor 10 may be made of a birefringent material or a non-birefringent material. In certain embodiments, having the touch sensor 10 within the display stack 21 allows for a display stack with touch sensing capability that is substantially free of any air gaps between the touch sensor 10 and display stack 21. As such, in certain embodiments, having the touch sensor 10 within the display stack 21 allows for a display stack with touch sensing capability that is thinner than a traditional display stack with a touch sensor added on top of the display stack.

Figure 10:
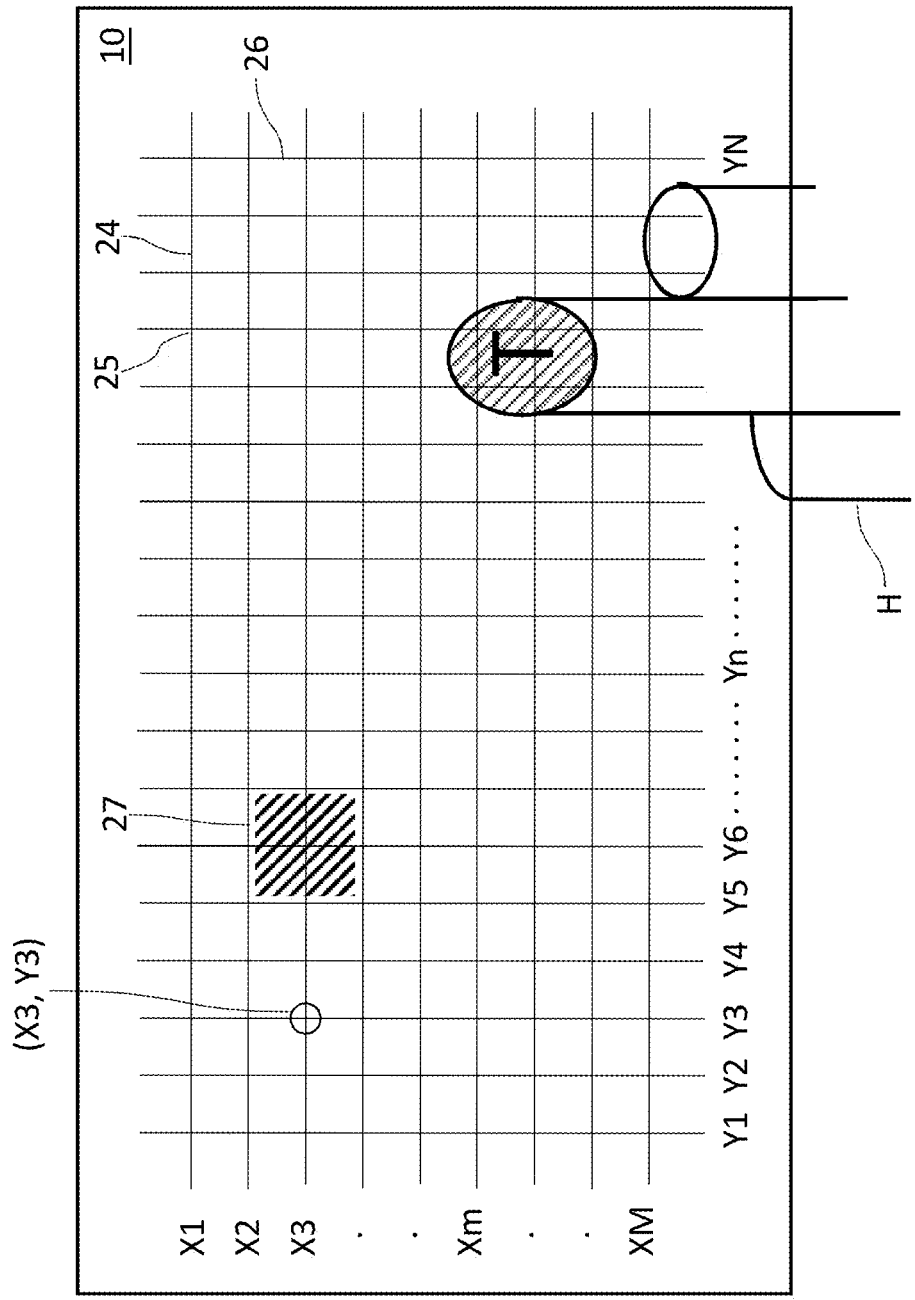
FIG. 10 is a schematic drawing in plan view of an example touch sensor according to embodiments of the disclosure.

FIG. 10 is a schematic plan view of an example touch sensor 10 according to embodiments of the disclosure which is of the grid type. There are two groups of parallel electrodes, X electrodes 24 and Y electrodes 26. The X and Y electrodes are illustrated as extending orthogonal to each other, but other angles could be used, so long as the X and Y electrodes cross to form a suitable number and overall density of nodes 25, where nodes are defined by the crossing points of pairs of X and Y electrodes (as viewed in plan view). An example node (X3, Y3) is marked in the figure. The number of nodes 25 will generally be the product of the number of X electrodes and Y electrodes—in the illustrated example there are M×N nodes, where M is the number of X electrode lines and N is the number of Y electrode lines. Each node, i.e. crossing point, 25 is associated with a sub-area 27 of the touch sensor into which X and Y electrode patterning can extend so that touches will generate signals that will be associated with that node. (No electrode patterning is shown in FIG. 10; only the so-called spines of the X and Y electrodes.) For example, in the figure, node (X3, Y6) has a possible associated sub-area 27 marked with bold hatching. Assuming that there are no crossings between X and Y electrodes except at the principal crossing-points 25 (which is the usual case), then the extent of the sub-area for an arbitrary crossing point between electrodes $X_n$ and $Y_n$ is defined by the area formed between electrodes $X_{n-1}$ and $X_{n+1}$ and $Y_{n-1}$ and $Y_{n+1}$, i.e. a block of four squares in FIG. 10. In some electrode patterns, touches anywhere within the sub-area will generate signals that will be associated with that node. However, with other electrode patterns, only a portion of the sub-area will be associated with the node. The X and Y electrodes are arranged either side of a dielectric layer (not visible in the figure), so they are vertically offset from each other by the thickness of the dielectric layer, vertical meaning orthogonal to the plane of the stack layers, i.e. in the figure perpendicular to the plane of the paper. If desired, it is possible to deposit the X and Y electrodes on the same side of a dielectric, substrate layer with thin films of insulating, dielectric material being locally deposited at the cross-overs to avoid shorting between the X and Y electrodes. A single electrode layer design of this kind is disclosed in US 2010/156810 A1, the entire contents of which are incorporated herein by reference. In the figure, a schematic touch T by a finger from a user's hand H is shown. From the illustration, it is clear that a single touch can often extend over several nodes—in the illustration the touch covers four nodes extending over two adjacent X lines and two adjacent Y lines. Having signals from at least two adjacent X electrodes and at least two adjacent Y electrodes respectively enables interpolation of the touch signals to be performed in both x and y directions in order to deduce the x, y touch coordinates.

Figure 11:
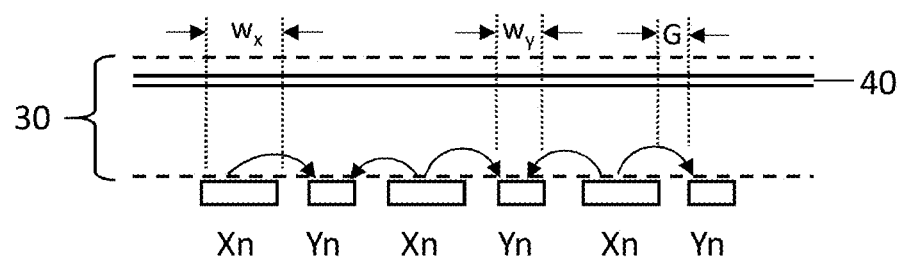
FIG. 11 is a schematic cross-section through a touch panel showing the electric field distribution during a mutual capacitance measurement for a highly interdigitated electrode pattern according to several embodiments of the disclosure.

FIG. 11 is a schematic cross-section through a touch panel 30 with a segmented conductive layer 40 showing the electric field distribution during a mutual capacitance measurement for a highly interdigitated electrode pattern according to some embodiments of the disclosure. The schematic cross-section is in a plane perpendicular to the plane of the stack showing a mutual capacitance measurement involving multiple interdigitated electrode branches of X (drive) and Y (sense) electrodes: Xn, Yn. Electric field lines are shown schematically with the arrow-headed, curved lines. As can be appreciated from the schematic depiction, field strength is highest in the region adjacent the gap 'G' between the X and Y electrodes and decreases towards the interior of each electrode, the gap 'G' being dimensioned to be suitable for making a mutual capacitance measurement of a touching object impinging on the touch surface. A high degree of interdigitation or interleaving between the X and Y electrode branches, which can be relatively narrow, with widths '$w_x$' and '$w_y$,' respectively in cross-section in the plane of the electrode pattern and transverse to the direction of extent of the relevant electrode branch, has the consequence that a highly uniform electrical field distribution in the plane of the touch surface is provided within each node area, and hence across all nodes, i.e. the whole sensor area. In the following, the cross-sectional dimension of an electrode branch in the plane of the electrode pattern transverse to the direction of extent of the electrode branch is often referred to as width, where it will be understood this is the dimension in the xy-plane of the electrode branch, i.e. in a plane orthogonal to the z-direction which is the direction of building the layer stack.

Figure 12:
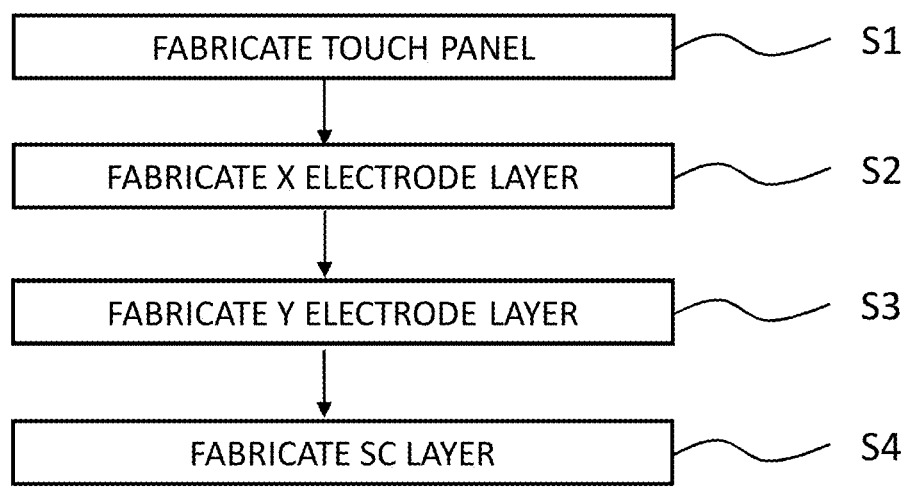
FIG. 12 is a flow chart showing a method of manufacturing a device incorporating a capacitive touch sensor according to an embodiment.

FIG. 12 is a flow chart showing a method of manufacturing a device incorporating a capacitive touch sensor. Step S1 involves fabricating a touch panel layer having on an upper side a touch surface and on a lower side an internal surface, the touch panel layer being made of a dielectric material. Step S2 involves fabricating an X electrode layer accommodating a set of X electrodes arranged under the touch panel layer and extending in an x direction. Step S3 involves fabricating a Y electrode layer accommodating a set of Y electrodes arranged under the touch panel layer and extending in a y direction different from the x direction, such that the X and Y electrodes cross each other to form a two-dimensional array of nodes defining a touch sensitive area. Step S4 involves fabricating a segmented conductive layer of conductive material embedded in the touch panel, the segmented conductive layer comprising a plurality of segments of the conductive material which are separated by gaps. It will be understood that the X and Y electrode layers could be one and the same layer, or separate layers.

FIGS. 12A and 12B are schematic drawings of an embodiment. FIG. 12A shows an electrode pattern comprising a nominal 3×3 array of nodes with associated tracks and connection pads, whereas FIG. 12B shows a zoomed in portion of FIG. 12A in the immediate vicinity of one of the nodes. It will be appreciated that a commercial device will normally have a larger node array, but a 3×3 array is sufficient to show all aspects of the pattern, in particular at the x and y edges and corners as well as in the interior away from the edges.

For mutual capacitance measurements, we take the X electrodes as being connected to be operable as drive electrodes and the Y electrodes as being connected to be operable as sense electrodes. (However, the opposite arrangement is also possible, i.e. X is sense and Y is drive.) The X electrodes may be arranged below the Y electrodes, so that the Y electrodes are closer to the touch panel than the X electrodes. (However, the opposite ordering is also possible.)

The electrode pattern forms one or more layers of a capacitive touch sensor as described elsewhere in this document. The electrode pattern underlies a touch panel having on an upper side a touch surface and on a lower side an internal surface. The touch panel is made of a dielectric material. The electrode pattern may be embedded in a dielectric material, such as a suitable adhesive and/or be disposed on one side of a non-conductive substrate.

Elements of the basic structure are as described above in relation to FIG. 8 and FIG. 10. Referring to FIG. 12A, three rows of X electrodes 24 are connected to respective X-electrode tracks 14X which lead to connection pads 16X to ohmically couple each row of X electrodes to a touch-sensor controller. Similarly, three columns of Y electrodes 26 are connected to respective Y-electrode tracks 14Y which lead to connection pads 16Y to ohmically couple each column of Y electrodes to a touch-sensor controller. The X electrodes are shown with lighter grey shading and the Y electrodes darker in the figure.

Each electrode has a branch structure with a central spine or trunk which is the part of the electrode that forms the nodes, and branches off the spine, which in turn may have branches from them also. We therefore refer to a spine as a zeroth order branch, a branch from the spine as a first order branch, a branch from the first order branch as a second order branch and so forth. The second, third, fourth etc. order branches are collectively referred to as higher order branches in contradistinction from the zeroth order branches.

The electrode pattern therefore comprises a set of X electrodes 24 each having a zeroth order branch (i.e. X-spine) extending in an x-direction and a set of Y electrodes 26 each having a zeroth order branch (i.e. Y-spine) extending in a y-direction transverse to the x-direction. Typically, the x- and y-directions will be at right angles to each other, although this is not technically necessary. The zeroth order branches of the X and Y electrodes cross each other at crossing points 25 to form a two-dimensional array of nodes. The zeroth order branches of any two adjacent X electrodes and any two adjacent Y electrodes enclose a sub-area, which is square or rectangular in the case of x being orthogonal to y. It will be appreciated that in commercial devices, the sub-areas are most commonly square to provide the same touch resolution in the x and y directions.

The X and Y electrodes 24 and 26 each further comprise higher order branches of order n, each of which is confined to the sub-area into which it buds or branches. The value 'n' is a positive integer (i.e. 1, 2, 3 . . . ). An nth order branch buds from an (n−1)th order branch. Away from edges of the node array, each node is thus associated with four sub-areas.

Each X electrode 24 has first order branches 241, branching from its zeroth order branch 240, and second order branches 242 branching from its first order branches 241. The zeroth order branch 240 extends in the x direction. The first order branches 241 extend in the y direction. The second order branches 242 extend in the x direction. Each Y electrode 26 has first order branches 261, branching from its zeroth order branch 260. The zeroth order branch 260 extends in the y direction. The first order branches 261 extend in the x direction.

The zeroth order X and Y branches 240, 260 are narrowed at the crossing points 25 to reduce the area of crossing represented by the product of the respective thicknesses of the X and Y zeroth order branches at the crossing point 25. In the plan view illustration, the Y branch 260 is shown passing over the X branch 240 in the manner of a bridge and river respectively. (Alternatively, the zeroth order X branch could pass over the zeroth order Y branch.)

In each sub-area, certain ones of the higher order X and Y branches extend alongside one another separated by a gap 'G' suitable for making a mutual capacitance measurement of a touching object impinging on the touch surface. In the illustrated pattern, the co-extending higher order X and Y branches are first order Y branches 261 and second order X branches 242 which extend in the x direction. The co-extension is in the form of an interdigitation of fingers, the fingers being the above-mentioned higher order branches.

As can be seen from FIG. 12B, in each sub-area, the outermost second order X branches 242 (i.e. farthest from either side of the zeroth order branch in the y-direction) enclose the outermost (also in the y-direction) first order Y branches 261. These outermost second order X branches are given the reference numeral 242E. The mutual capacitances between the second order X branches and first order Y branches are thus substantially confined to, i.e. encapsulated in, the portion of the sub-area illustrated in FIG. 12B. In the y-direction, the outermost second order X branches 242E that provide the field encapsulation are directly adjacent to those of the neighbouring X electrode, i.e. there is no portion of Y electrode in between them. One of these pattern regions is marked with the dotted box labelled 'E' in FIG. 12A.

In particular, it can be seen that there is one more interdigitating X branch than Y branch (5 vs 4 in the illustration) so that all the interdigitating Y branches are enclosed by interdigitating X branches.

The exact number of co-extending higher order branches per sub-area can be varied as desired. For example, there may be 4, 5, 6, 7, 8, 9, 10 or more higher order X and 4, 5, 6, 7, 8, 9, 10 or more higher order Y branches that extend alongside one another. The degree of interdigitation can thus be freely chosen as part of the design.

It is also noted that although the problem of signal inversion has been discussed in connection with the effect of arranging a display close to a touch sensor in a touch screen, the same effect could in principle occur in other situations where a metallic layer is arranged under a capacitive touch sensor, for example with a CCD chip or other image sensor with electrodes that is arranged under a touch sensor.

Stack Configurations

By way of example the following figures show various specific stack implementations for LCD and OLED touch screens. In these implementations, it will be appreciated that one or more adhesive layers (e.g., OCA) may be used to bind layers of the display and touch sensor stack together, but these are not illustrated. Moreover, in these implementations, it will be understood that the touch panel is optically transparent in the visible region in order to be suitable for display applications and is made of a resilient material suitable for acting as the touch surface, such as for example a suitable glass or plastics material. Suitable plastics materials include polycarbonate (PC) and polymethyl methacrylate (PMMA). Further, it will be understood that embodiments may also be realised with other stack implementations, such as for example those described in US 2014/0226089 A1 (Atmel Corporation) and US 2016/259481 A1 (LG Electronics, Inc.), the entire contents of which are incorporated herein by reference.

In the following figures, the touch panel is disclosed as one layer of the stack. It will be appreciated with reference to FIG. 6 and FIG. 7 above that the touch panel comprises the touch panel glass or plastics layer, optionally a top hard coat for anti-scratch and also the segmented conductive layer. In each of the following figures, it will be appreciated that the touch panel can be realised with different sequences of top coat, glass/plastics layer and segmented conductive layer, specifically the sequence can be varied as it is varied between FIG. 6 and FIG. 7, and as described in the text describing FIG. 6 and FIG. 7.

Figure 13:
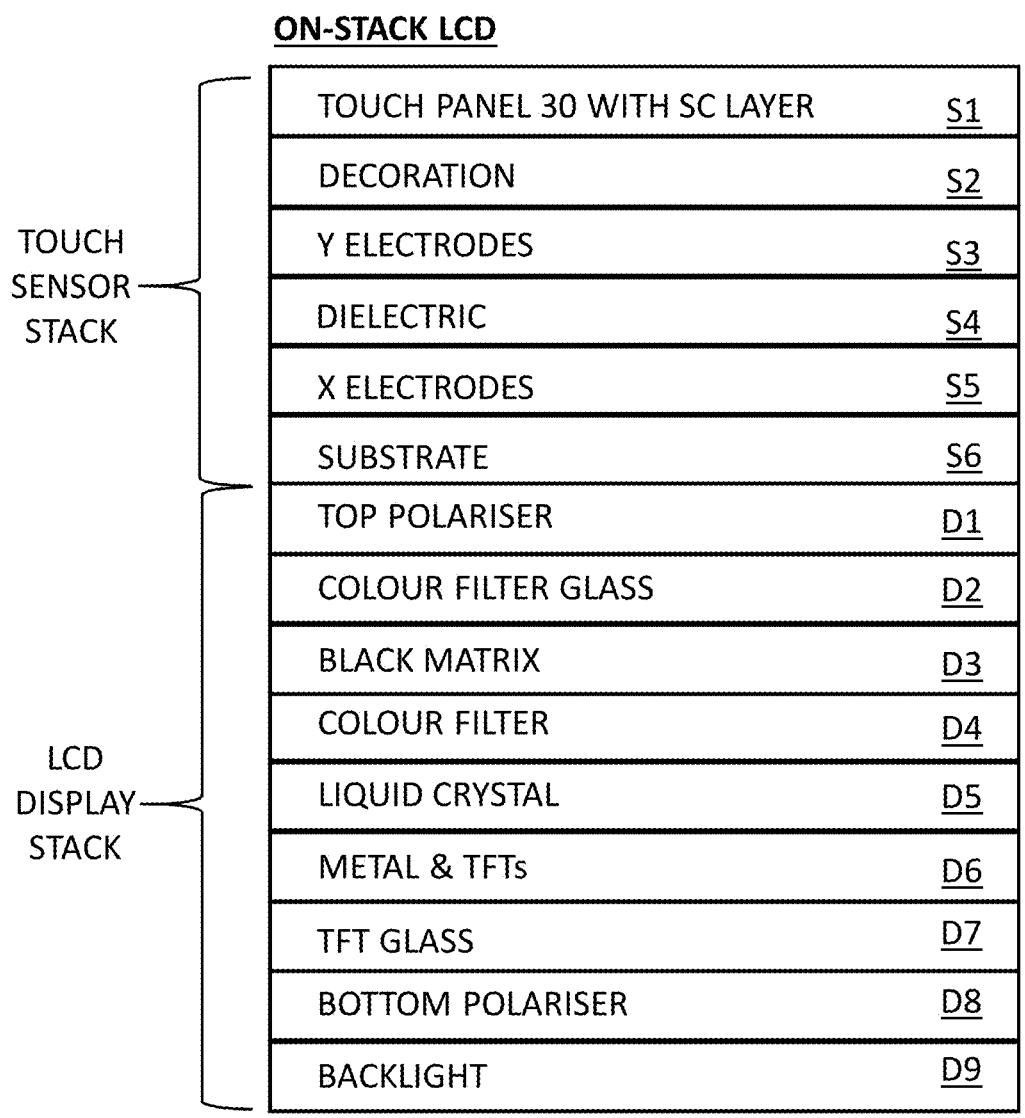
FIG. 13 shows a sensor and display stack of an on-stack LCD embodiment of the disclosure.

FIG. 13 shows a sensor and display stack of an on-stack LCD embodiment of the disclosure. An on-stack design refers to the fact that the touch sensor is arranged on top of and is a separate sub-assembly from the display, each operating effectively independently. The LCD display stack starts with a backlight unit, then a bottom polariser and a glass layer to act as a substrate for the thin film transistors (TFTs). The TFTs together with their addressing and other electrodes, referred to as metal, are arranged in top of the TFT glass. It will be understood that reference to metal includes any suitable metallically conductive material, it often being the case that ITO is used (i.e. a non-metal), since it is transparent and therefore suitable for display applications. For other applications, the electrode material may be opaque. The next layer is the liquid crystal layer followed by a colour filter layer. It will be appreciated that suitable spacers will be provided to maintain a design thickness for the liquid crystal layer. Next there is a black matrix layer for contrast enhancement, colour filter glass, and finally a top polariser. It will be appreciated that additional layers, such as adhesive, coatings and so forth may also be included as desired. Moreover, some of the recited layers could be omitted, for example the black matrix. A simpler structure would also result if the display was monochrome. The touch sensor stack is arranged on top of the display stack and commences with a substrate, made of a material such as a glass material (e.g. an alkali aluminosilicate glass) or a plastics material (e.g. PET) for example, on which the X electrodes are deposited. The X electrodes may be embedded in a dielectric matrix, such as an adhesive layer. On top of the X electrodes there is a dielectric and then the Y electrodes. It will be appreciated that in a single layer design, the substrate would be the dielectric and the X & Y electrodes would be arranged thereon, thereby removing two of the illustrated layers. There then follows an optional decoration layer. Finally, there is a touch panel 30 incorporating an SC layer as shown in either FIG. 3 or FIG. 4.

Figure 14:
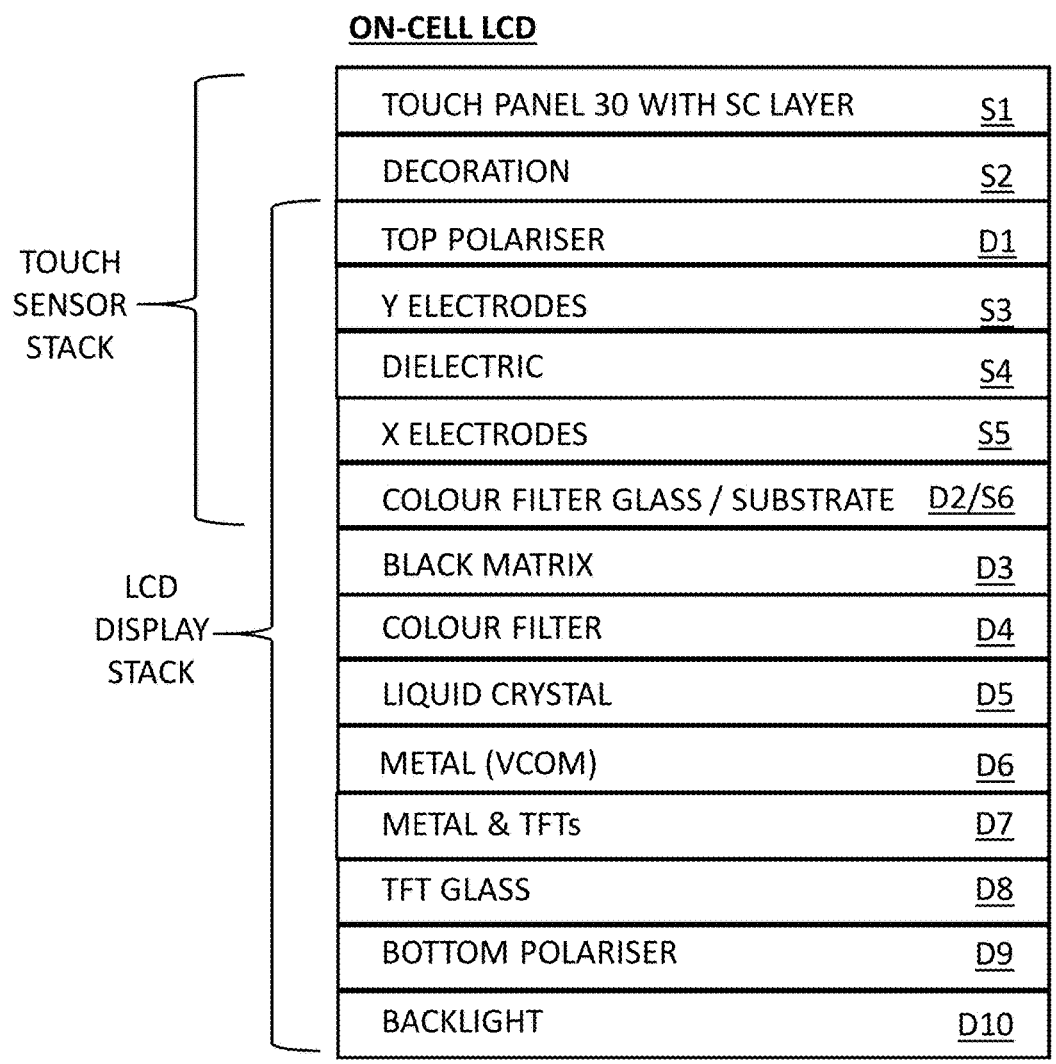
FIG. 14 shows a sensor and display stack of an on-cell LCD embodiment of the disclosure.

FIG. 14 shows a sensor and display stack of an on-cell LCD embodiment of the disclosure. The term on-cell refers to the fact that the touch sensor uses the uppermost display stack layer, namely the colour filter glass, as the substrate for the initial layer of the sensor stack, namely the X electrodes. Compared with the on-stack design of FIG. 13, the only other change is that the top polariser has been moved to be above the touch sensor layers for the X and Y electrodes which has the effect of reducing the visibility of the electrode pattern. The touch panel 30 incorporates an SC layer as shown in either FIG. 3 or FIG. 4.

Figure 15:
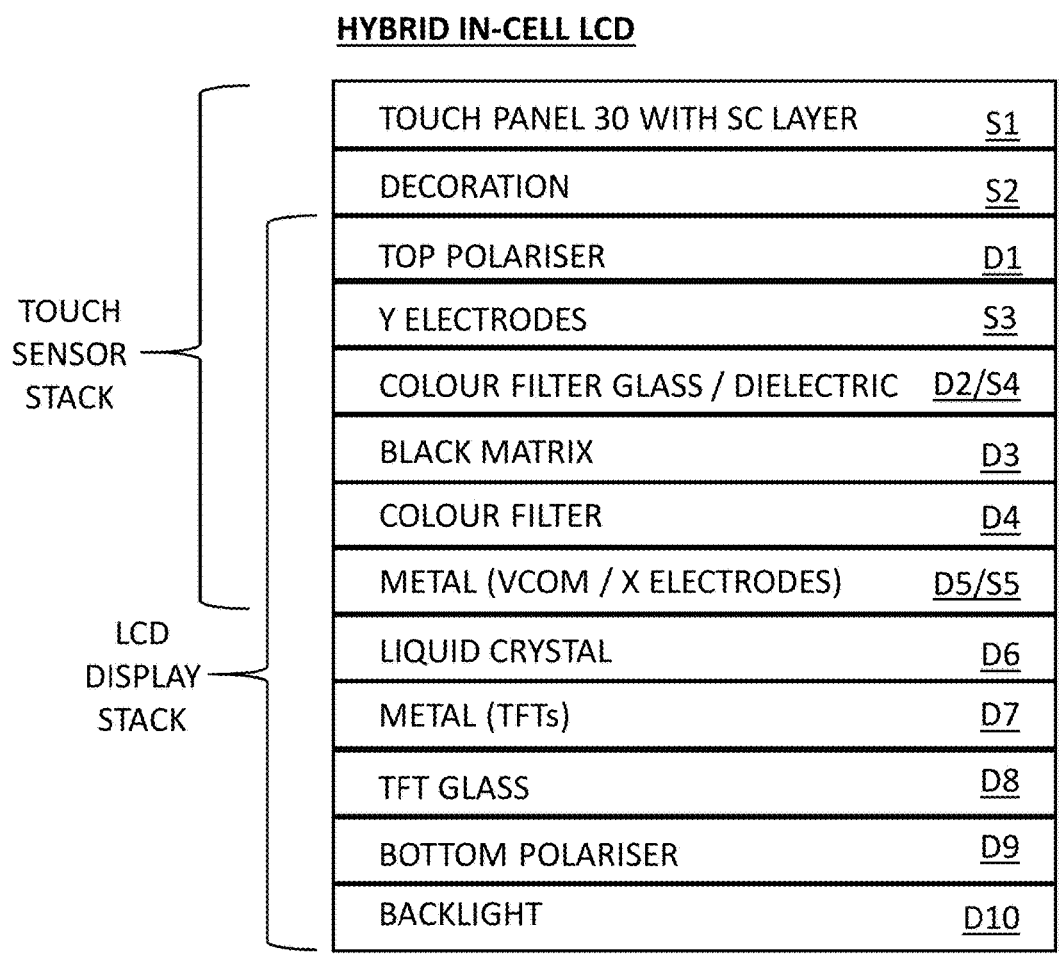
FIG. 15 shows a sensor and display stack of a hybrid in-cell LCD embodiment of the disclosure.

FIG. 15 shows a sensor and display stack of a hybrid in-cell LCD embodiment of the disclosure. The term in-cell refers to the fact that the touch sensor is more fully integrated within the display stack in that at least one of the touch sensor layers is arranged below the display's colour filter. In particular, some of the display driver electrodes (the VCOM electrodes that provide a reference voltage for the TFTs) can perform a dual function as touch sensor electrodes (the X electrodes), their functional separation being achieved by time multiplexing, i.e. for part of a cycle the electrodes are used for the display and for another part of the cycle for touch sensing. The dual function is achieved by patterning the VCOM electrode layer, which in an LCD without touch sensor is simply an unstructured blanket. For in-cell designs, there are two possibilities: "one-sided" in-cell if both X and Y sensor electrode layers below the colour filter glass, and "two-sided" or "hybrid" in-cell if only one of the X and Y sensor electrode layers moves below the colour filter glass. In a hybrid in-cell design, the electrode layer above the colour filter glass, nearest to the touch panel, will be the layer used for sense (i.e. Y electrode) in mutual capacitance measurements. The touch panel 30 incorporates an SC layer as shown in either FIG. 3 or FIG. 4. It will be appreciated that in an in-cell design, the electronics driving the display and the touch sensor need to be coordinated, so that either one single IC is provided for jointly controlling the display and touch sensor, or, if dedicated display and touch-sensor controller ICs are retained, they need to exchange data to ensure coordination.

Figure 16:
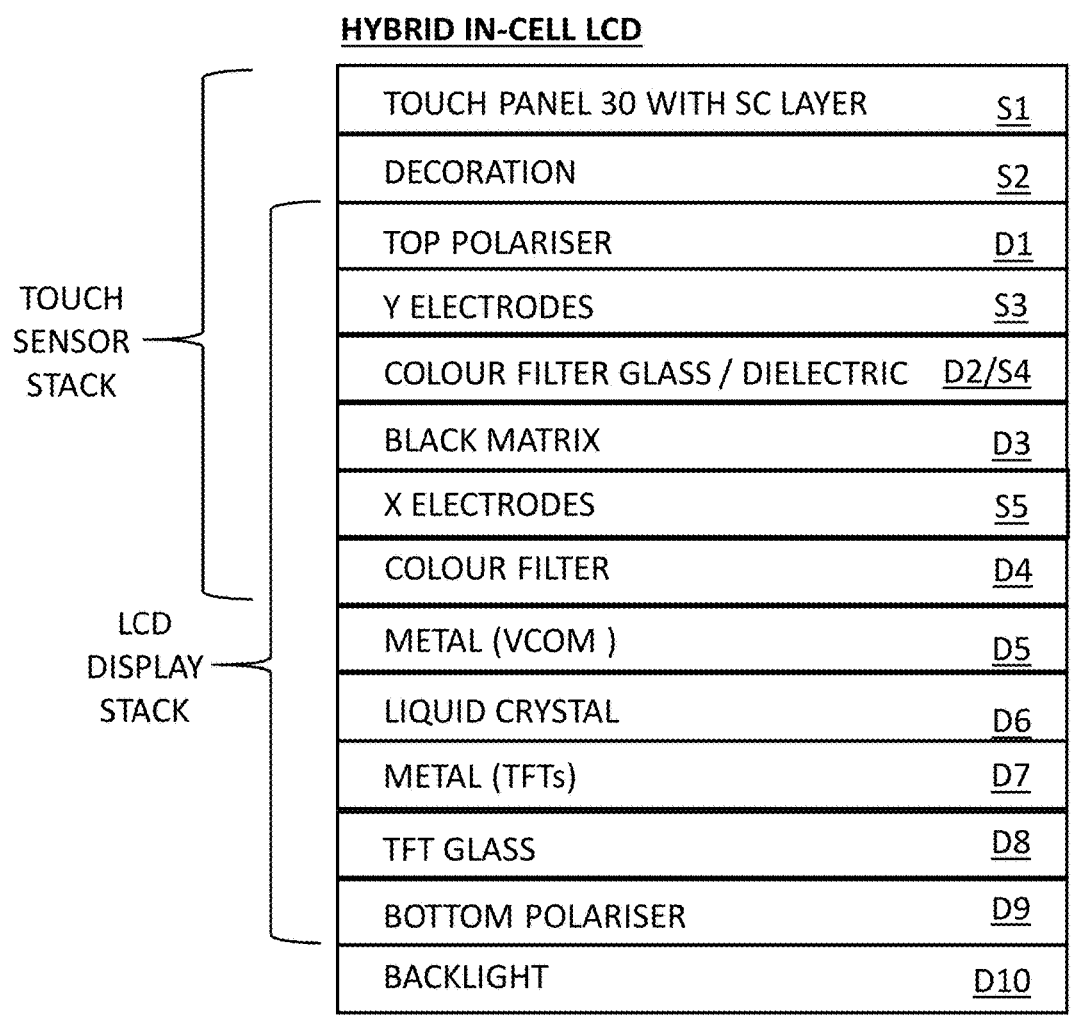
FIG. 16 shows a sensor and display stack of another hybrid in-cell LCD embodiment of the disclosure.

FIG. 16 shows a sensor and display stack of another hybrid in-cell LCD embodiment of the disclosure. In comparison to the stack of FIG. 15, the X electrodes are not integrated with the VCOM so that capacitive sensing measurements can take place in parallel with driving the display. The X electrodes are arranged on the colour filter. It is illustrated that the X electrodes are arranged on the upper side of the colour filter, but they could be arranged on the lower side. Moreover, a separate substrate layer for supporting the X electrodes could be provided. The touch panel 30 incorporates an SC layer as shown in either FIG. 3 or FIG. 4.

Figure 17:
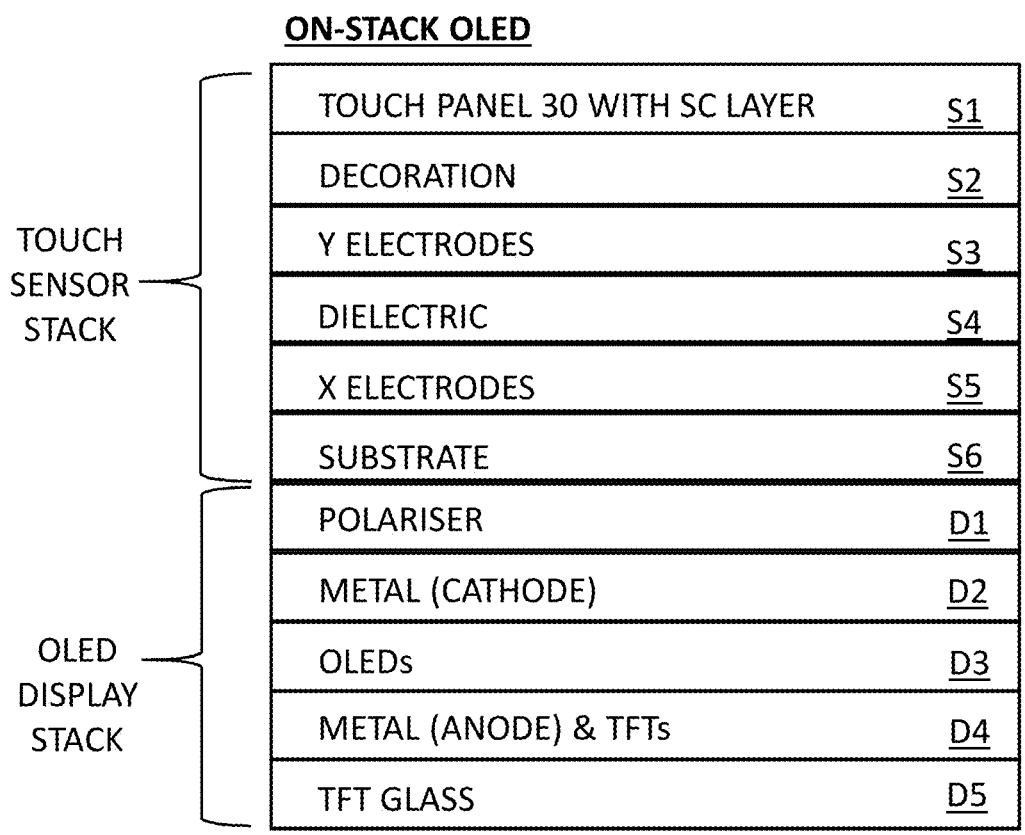
FIG. 17 shows a sensor and display stack of an on-stack OLED embodiment of the disclosure.

FIG. 17 shows a sensor and display stack of an on-stack OLED embodiment of the disclosure. The OLED display stack starts with a glass layer to act as a substrate for the thin film transistors (TFTs). The TFTs together with their addressing and other electrodes, referred to as metal, are arranged in top of the TFT glass. The metal in this layer includes metal for anode electrodes for driving the OLEDs. Next there follows the OLED layer and another metal layer for the OLEDs cathodes. It will be appreciated that anode and cathode layers could be reversed. Finally, the display stack is completed by a polariser. For an OLED, it is noted that generally a colour filter and colour filter glass is not needed. However, for white OLEDs, they may be provided in which case those layers would be arranged above the OLEDs and below the metal (cathode) layer. It will also be appreciated that additional layers, such as adhesive, coatings and so forth may also be included as desired. The touch sensor stack is arranged on top of the display stack's cathode electrode layer and commences with a substrate on which the X electrodes are deposited. The X electrodes may be embedded in a dielectric matrix, such as an adhesive layer. On top of the X electrodes there is a dielectric and then the Y electrodes. There then follows an optional decoration layer. The final layers are those of the touch panel 30 which incorporates an SC layer as shown in either FIG. 3 or FIG. 4.

FIG. 18 shows a sensor and display stack of a hybrid in-cell OLED embodiment of the disclosure. The OLED display stack starts with a glass layer to act as a substrate for the thin film transistors (TFTs). The TFTs together with their addressing and other electrodes, referred to as metal, are arranged in top of the TFT glass. The metal in this layer includes metal for anode electrodes for driving the OLEDs. Next there follows the OLED layer and another metal layer for the OLEDs cathodes. It will be appreciated that anode and cathode layers could be reversed. The display stack is completed by a polariser, but in this embodiment the polariser is arranged above the touch sensor electrodes. Placing the polariser above the touch sensor electrodes has the advantage that the polariser partly obscures the pattern of the touch sensor electrodes, which would otherwise be more visible to a user under a wider variety of lighting conditions and angles of view. It will also be appreciated that additional layers, such as adhesive, coatings and so forth may also be included as desired. A slightly different structure could also result if the display was monochrome. Touch sensor stack layers are arranged on top of the display stack's cathode layer. The first touch sensor stack layer is a substrate. The X & Y electrodes are then formed in a single layer, and may be embedded in a dielectric matrix, such as an adhesive layer. There then follows the above-mentioned polariser for the display stack an optional decoration layer. Finally, there is the touch panel 30 which incorporates an SC layer as shown in either FIG. 3 or FIG. 4. Some common variations to this stack are as follows. We also note that the general comments on in-cell designs made in relation to the above hybrid in-cell LCD embodiments also apply to this in-cell OLED embodiment.

FIG. 19 shows a sensor and display stack of another hybrid in-cell OLED embodiment of the disclosure. The layer structure starts with a glass layer for acting as a substrate for the subsequent TFT layer which includes the TFTs and their drive electrodes, including dual function electrodes which serve as the VCOM electrodes for the OLEDs providing a reference voltage for the TFTs and the X electrodes for touch sensing. There then follows the OLED layer. A dielectric layer then follows which serves as a substrate for another metal layer comprising dual purpose electrodes to act as the cathodes for the OLEDs and the Y electrodes for sense in the touch sensor. The stack is completed with: the polariser for the display, an optional decoration layer and the touch panel 30. The touch panel 30 incorporates an SC layer as shown in either FIG. 3 or FIG. 4. We also note that the general comments on in-cell designs made in relation to the above hybrid in-cell OLED embodiment and in-cell LCD embodiments also apply to this in-cell OLED embodiment.

It will be appreciated that the touch sensor stack of any of the on-stack embodiments may form the basis for further embodiments which do not include a display, i.e. stand-alone touch sensors, such as a touchpad of a laptop computer, or a touch-sensitive rear housing panel of a mobile phone.

Moreover, in any of the example stacks, the X and Y electrode layers could be swapped. Further, in any of the example stacks, the X and Y electrode layers could be arranged in a single layer.

A touch screen computing device (or touch sensor device without screen) as presented herein may for example be a mobile phone (smartphone), phablet, tablet including specialist drawing tablet, laptop computer, personal computer, smart television, media player, satellite navigation device, games console, kiosk computer, or point-of-sale device. The device may be a user equipment as defined by one or more telecommunications standards. The device may be portable, e.g. a handheld computing device, or fixed. The touch screen (or touch sensor without screen) may form part of a household appliance or other appliance.

Device Context Description

FIG. 20A and FIG. 20B are schematic perspective views from the front and behind of a handheld touch screen computing device.

Figure 21:
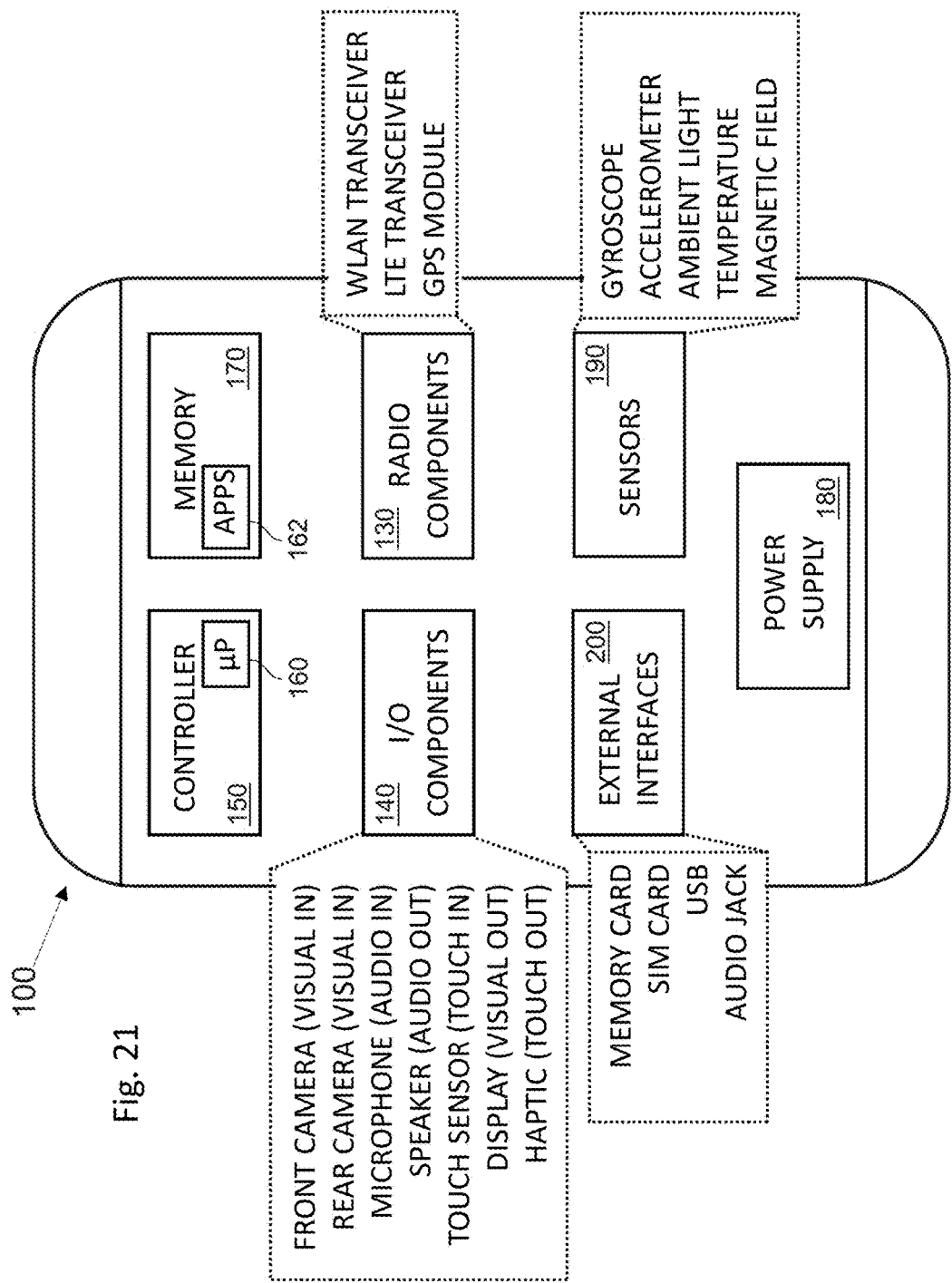
FIG. 21 is a block diagram of the functional components of the computing device of FIG. 20A and FIG. 20B.

FIG. 21 is a block diagram of the functional components of the computing device of FIG. 20A and FIG. 20B.

Referring to FIG. 20A, the computing device 100 has a smartphone or tablet format. The computing device 100 is arranged in a housing with a front face (facing outwards from FIG. 20A), a rear face and a bezel forming the edges of a substantially rectilinear object. The front face is mostly taken up with a touch screen display which combines a display 102 (shown displaying a scene with house, smoke and sun) with a touch sensitive area 103 (shown with the hatching). The touch screen enables the user to input commands to applications running on the computing device through gestures, which vary from the humble single touch of a point on the display to select it, referred to in the art as a tap, and other single touch gestures, such as a swipe, through to multitouch gestures such as the two-finger pinch conventionally used for zooming in and out and rotating. We note that in this document references to gestures means touch gestures on a touch screen. The front face also accommodates a mechanical key (or button) 104 and two touch sensor keys (or buttons) 106, 108, on either side of the mechanical key 104. The edges of the housing accommodate a mechanical rocker switch 110 for volume control and an on/off switch 112. There is also a haptic layer embedded in the touch screen 102 to provide tactile feedback (not shown).

A front facing camera 101 for capturing stills or video images is arranged on the front face near the top of the housing facing forwards and has adjacent to it a microphone 105 for capturing audio and a speaker 107 for outputting audio.

Referring to FIG. 20B, the rear view, a rear facing camera 114 for capturing stills or video images is arranged near the top of the housing facing backwards. A battery 116 is accommodated within the housing and constitutes a power supply (shown with dashed lines). The power supply further includes an external power input socket 118 which may be used for powering the device as well as charging the battery. Alongside the power input socket 118 at the bottom of the device there is another external connector in the form of an audio jack 120 for audio output. Further external interfaces may be provided including various ports, holders and sockets for physical connections. With dotted lines we show two internal holders 122, 124 which may be for a SIM card and a memory card or further SIM card. The memory card is a kind of data storage device.

Referring to FIG. 21, this shows selected functional components of the computing device 100. The computing device 100 has radio components 130, input/output (I/O) components 140, one or more controllers 150 associated with one or more processors 160 and one or more memories 170, a power supply 180, sensor components 190 and external interfaces 200. The memory 170 is operable to store computer applications ('apps') 162 which comprise software code portions that are loadable into and executable by the processor 160. The controller(s) 150 may include a touch-sensor controller and a display controller, or a combined touch and display controller.

The processor(s) may comprise separate processing units for specialist tasks such as touch sensing, display drive, video processing, speech/audio analysis and/or speech/audio synthesis. The controller(s) and associated processor(s) and memory(ies) have the task of controlling the computing device and executing computer programs stored in the memory(ies). The memory(ies) may store computer applications for running on the computing device as well as collecting data from the various I/O devices. The controller(s) typically functions to control overall operation of the computing device, in addition to the operations associated with the application programs. The controller(s) processes signals, data, information and the like input or output through the above-mentioned components and/or runs application programs saved in the memory, thereby processing or providing a user with appropriate information and/or functions.

The radio components 130 includes a WLAN transceiver, an LTE transceiver, and a GPS module. The I/O components 140 include a display capable of displaying content and also acting as part of a graphical user interface, wherein the display may be based on a suitable technology such as liquid crystal or organic light emitting diodes, as well as a position-sensitive touch sensor area overlaid on, or formed as an integral part of, the display to serve as part of a graphical user interface in conjunction with the display with optionally other touch sensor areas or buttons (e.g. on the reverse side or edge (bezel) of the device housing). Further I/O components, as previously mentioned, are front and rear facing cameras for capturing stills or video images, a microphone for capturing audio, a speaker for outputting audio and a haptic output embedded in the touch screen to provide tactile feedback. The sensing components include a gyroscope, an accelerometer, an ambient light sensor, a magnetic field sensor and a temperature sensor, for example. The external interfaces may include various ports and sockets for physical connections, such as a SIM card, wired LAN connectors, memory cards, audio jack socket, USB ports and so forth.

It will be clear to one skilled in the art that many improvements and modifications can be made to the foregoing exemplary embodiment without departing from the scope of the present disclosure.

The invention claimed is:

1. A device incorporating a capacitive touch sensor, the device comprising:
    a touch panel having on an upper side a touch surface and on a lower side an internal surface, the touch panel being made of a dielectric material and having a thickness of less than 500 micrometers;
    an X electrode layer accommodating a set of X electrodes arranged under the touch panel and extending in an x direction;
    a Y electrode layer accommodating a set of Y electrodes arranged under the touch panel and extending in a y direction different from the x direction, such that the X and Y electrodes cross each other to form a two-dimensional array of nodes defining a touch sensitive area in which adjacent portions of the X and Y electrodes are separated by a gap 'G' suitable for making a mutual capacitance measurement of a touching object impinging on the touch surface; and
    a segmented conductive layer of conductive material embedded in the touch panel beneath the touch surface to pre-load the mutual capacitance between the adjacent portions of the X and Y electrodes of the sensor to the same or similar level of that of a floating touch of maximum size that it is desired to mitigate against, the segmented conductive layer comprising a plurality of segments of the conductive material which are separated by gaps 's' having widths of between 10 and 1000 micrometers.

2. The device of claim 1, wherein the touch panel is subdivided into a coating layer having the touch surface on its upper side and, underneath the coating layer, a structural layer, with the segmented conductive layer being arranged between the coating layer and the structural layer.

3. The device of claim 1, wherein the touch panel comprises a structural layer and the segmented conductive layer is arranged under the structural layer, the touch panel further comprising a separating layer of dielectric material arranged between the segmented conductive layer and the X and Y electrode layers.

4. The device of claim 3, wherein the segmented conductive layer is arranged directly under the structural layer.

5. The device of claim 1, further comprising a polarizer layer arranged above the X and Y electrode layers, wherein the segmented conductive layer is arranged directly on one side of the polarizer layer.

6. The device of claim 1, wherein the dimensions of the device are selected such that, in a mutual capacitance measurement, a large area touch, that is one covering at least twenty-five contiguous array nodes, causes a change in mutual capacitance as measured between the X and Y electrodes of the same sign regardless of the ground condition of the touch.

7. The device of claim 1, wherein the dimensions of the device are selected such that, in a mutual capacitance measurement, a small area touch, that is one covering an area less than an area defined by a quadrilateral of four adjacent array nodes, causes a change in mutual capacitance as measured between the crossing X and Y electrodes adjacent the touch, which is of the same sign regardless of the ground condition of the touch.

8. The device of claim 1, wherein the gaps 's' have widths of between 20 and 100 micrometers.

9. The device of claim 1, wherein each segment is separated from its adjacent segment by a gap 's' of width $W_{SX}$ and $W_{SY}$ in the x and y directions respectively, wherein each of $W_{SX}$ and $W_{SY}$ is between 10 and 1000 micrometers.

10. The device of claim 9, wherein the gaps 's' have widths of between 20 and 100 micrometers.

11. The device of claim 9, wherein the gap widths $W_{SX}$ and $W_{SY}$ are equal.

12. The device of claim 1, wherein the segments have areas of less than one square millimet.

13. The device of claim 1, wherein the X and Y electrode layers together form a single layer.

14. The device of claim 1, wherein the X and Y electrode layers form respective layers separated by an intermediate layer of a dielectric material.

15. The device of claim 1, wherein:
the X electrodes comprise zeroth order branches extending in the x direction;
the Y electrodes comprise zeroth order branches extending in the y direction, such that it is the zeroth order branches of the X and Y electrodes which cross each other, and such that the zeroth order branches of any two adjacent X electrodes and any two adjacent Y electrodes enclose a sub-area; and
the X and Y electrodes each further comprising higher order branches of order n, each of which is confined to the sub-area into which it buds, where order n is a positive integer and where an nth order branch buds from an (n−1)th order branch, so that, away from edges of the node array, each node is associated with four sub-areas, and wherein, in each sub-area, at least some of the higher order X electrode branches have portions which co-extend with at least some of the higher order Y branches, where the co-extending X and Y portions are separated by a gap suitable for making a mutual capacitance measurement of a touching object impinging on the touch surface.

16. The device of claim 1, wherein the segments of the conductive material represent a macrostructure of the segmented conductive layer, and wherein the conductive material of each segment has a microstructure formed of a mesh of the conductive material with micro-areas absent of the conductive material in the mesh.

17. The device of claim 1, further comprising a display configured to operate in conjunction with the capacitive touch sensor and thereby form a touch screen.

18. The device of claim 17, wherein the display has electrode layers and is arranged such that the uppermost one of the display electrode layers is separated from the lower of the X and Y electrode layers by a distance of less than one of: 600, 500, 400, 300, 200 and 100 micrometers.

19. The device of claim 1, wherein the touch panel has a thickness of less than one of: 400, 300, 200, 150 and 100 micrometers.

20. A method of manufacturing a device incorporating a capacitive touch sensor, the method comprising:
fabricating a touch panel having on an upper side a touch surface and on a lower side an internal surface, the touch panel being made of a dielectric material and having a thickness of less than 500 micrometers;
fabricating an X electrode layer accommodating a set of X electrodes arranged under the touch panel and extending in an x direction;
fabricating a Y electrode layer accommodating a set of Y electrodes arranged under the touch panel and extending in a y direction different from the x direction, such that the X and Y electrodes cross each other to form a two-dimensional array of nodes defining a touch sensitive area in which adjacent portions of the X and Y electrodes are separated by a gap 'G' suitable for making a mutual capacitance measurement of a touching object impinging on the touch surface; and
fabricating a segmented conductive layer of conductive material embedded in the touch panel beneath the touch surface to pre-load the mutual capacitance between the adjacent portions of the X and Y electrodes of the sensor to the same or similar level of that of a floating touch of maximum size that it is desired to mitigate against, the segmented conductive layer comprising a plurality of segments of the conductive material which are separated by gaps 's' having widths of between 10 and 1000 micrometers.

21. The method of claim 20, further comprising:
fabricating a display to form a single stack with the capacitive touch sensor and thereby form a touch screen.

22. The method of claim 20, wherein the X and Y electrode layers together form a single layer.

23. The method of claim 20, wherein the X and Y electrode layers form respective layers separated by an intermediate layer of a dielectric material.

24. The method of claim 20, wherein each segment is separated from its adjacent segment by a gap 's' of width $W_{SX}$ and $W_{SY}$ in the x and y directions respectively, wherein each of $W_{SX}$ and $W_{SY}$ is between 10 and 1000 micrometers.

25. The method of claim 24, wherein the gap widths $W_{SX}$ and $W_{SY}$ are equal.

26. The method of claim 20, wherein the touch panel has a thickness of less than one of: 300, 200, 150 and 100 micrometers.

27. A device incorporating a capacitive touch sensor, the device comprising:
a touch panel having on an upper side a touch surface and on a lower side an internal surface, the touch panel being made of a dielectric material;
an X electrode layer accommodating a set of X electrodes arranged under the touch panel and extending in an x direction;
a Y electrode layer accommodating a set of Y electrodes arranged under the touch panel and extending in a y direction different from the x direction, such that the X and Y electrodes cross each other to form a two-dimensional array of nodes defining a touch sensitive area in which adjacent portions of the X and Y electrodes are separated by a gap 'G' suitable for making a mutual capacitance measurement of a touching object impinging on the touch surface;

a segmented conductive layer of conductive material embedded in the touch panel beneath the touch surface to pre-load the mutual capacitance between the adjacent portions of the X and Y electrodes of the sensor to the same or similar level of that of a floating touch of maximum size that it is desired to mitigate against, the segmented conductive layer comprising a plurality of segments of the conductive material which are separated by gaps 's'; and a polarizer layer arranged above the X and Y electrode layers, wherein the segmented conductive layer is arranged directly on one side of the polarizer layer.

28. A device incorporating a capacitive touch sensor, the device comprising:

a touch panel having on an upper side a touch surface and on a lower side an internal surface, the touch panel being made of a dielectric material;

an X electrode layer accommodating a set of X electrodes arranged under the touch panel and extending in an x direction;

a Y electrode layer accommodating a set of Y electrodes arranged under the touch panel and extending in a y direction different from the x direction, such that the X and Y electrodes cross each other to form a two-dimensional array of nodes defining a touch sensitive area in which adjacent portions of the X and Y electrodes are separated by a gap 'G' suitable for making a mutual capacitance measurement of a touching object impinging on the touch surface; and a segmented conductive layer of conductive material embedded in the touch panel beneath the touch surface to pre-load the mutual capacitance between the adjacent portions of the X and Y electrodes of the sensor to the same or similar level of that of a floating touch of maximum size that it is desired to mitigate against, the segmented conductive layer comprising a plurality of segments of the conductive material which are separated by gaps 's' of width $W_{SX}$ and $W_{SY}$ in the x and y directions respectively, wherein each of $W_{SX}$ and $W_{SY}$ is between 10 and 1000 micrometers.

29. The device of claim 28, wherein the gaps 's' have widths of between 20 and 100 micrometers.

30. The device of claim 28, wherein the gap widths $W_{SX}$ and $W_{SY}$ are equal.

31. A device incorporating a capacitive touch sensor, the device comprising:

a touch panel having on an upper side a touch surface and on a lower side an internal surface, the touch panel being made of a dielectric material;

an X electrode layer accommodating a set of X electrodes arranged under the touch panel and extending in an x direction;

a Y electrode layer accommodating a set of Y electrodes arranged under the touch panel and extending in a y direction different from the x direction, such that the X and Y electrodes cross each other to form a two-dimensional array of nodes defining a touch sensitive area in which adjacent portions of the X and Y electrodes are separated by a gap 'G' suitable for making a mutual capacitance measurement of a touching object impinging on the touch surface; and a segmented conductive layer of conductive material embedded in the touch panel beneath the touch surface to pre-load the mutual capacitance between the adjacent portions of the X and Y electrodes of the sensor to the same or similar level of that of a floating touch of maximum size that it is desired to mitigate against, the segmented conductive layer comprising a plurality of segments of the conductive material have areas of less than one square millimeter and which are separated by gaps 's'.

32. A device incorporating a capacitive touch sensor and a display configured to operate in conjunction with the capacitive touch sensor and thereby form a touch screen, the device comprising:

a touch panel having on an upper side a touch surface and on a lower side an internal surface, the touch panel being made of a dielectric material;

an X electrode layer accommodating a set of X electrodes arranged under the touch panel and extending in an x direction;

a Y electrode layer accommodating a set of Y electrodes arranged under the touch panel and extending in a y direction different from the x direction, such that the X and Y electrodes cross each other to form a two-dimensional array of nodes defining a touch sensitive area in which adjacent portions of the X and Y electrodes are separated by a gap 'G' suitable for making a mutual capacitance measurement of a touching object impinging on the touch surface; and a segmented conductive layer of conductive material embedded in the touch panel beneath the touch surface to pre-load the mutual capacitance between the adjacent portions of the X and Y electrodes of the sensor to the same or similar level of that of a floating touch of maximum size that it is desired to mitigate against, the segmented conductive layer comprising a plurality of segments of the conductive material which are separated by gaps 's', wherein the display has electrode layers and is arranged such that the uppermost one of the display electrode layers is separated from the lower of the X and Y electrode layers by a distance of less than one of: 600, 500, 400, 300, 200 and 100 micrometers.

33. A method of manufacturing a device incorporating a capacitive touch sensor, the method comprising:

fabricating a touch panel having on an upper side a touch surface and on a lower side an internal surface, the touch panel being made of a dielectric material;

fabricating an X electrode layer accommodating a set of X electrodes arranged under the touch panel and extending in an x direction;

fabricating a Y electrode layer accommodating a set of Y electrodes arranged under the touch panel and extending in a y direction different from the x direction, such that the X and Y electrodes cross each other to form a two-dimensional array of nodes defining a touch sensitive area in which adjacent portions of the X and Y electrodes are separated by a gap 'G' suitable for making a mutual capacitance measurement of a touching object impinging on the touch surface; and fabricating a segmented conductive layer of conductive material embedded in the touch panel beneath the touch surface to pre-load the mutual capacitance between the adjacent portions of the X and Y electrodes of the sensor to the same or similar level of that of a floating touch of maximum size that it is desired to mitigate against, the segmented conductive layer comprising a plurality of segments of the conductive material which are separated by gaps 's' having widths of between 10 and 1000 micrometers.

34. The method of claim 33 wherein the gaps 's' have widths of between 20 and 100 micrometers.

\* \* \* \* \*

UNITED STATES PATENT AND TRADEMARK OFFICE
CERTIFICATE OF CORRECTION

Page 1 of 1

PATENT NO. : 10,452,219 B2
APPLICATION NO. : 15/886864
DATED : October 22, 2019
INVENTOR(S) : Justin Anthony Church and David Brent Guard It is certified that error appears in the above-identified patent and that said Letters Patent is hereby corrected as shown below:

In the Claims

Claim 26, Column 28, Line 50, change "one of: 300, 200, 150 and 100 micrometers" to --one of: 400, 300, 200, 150 and 100 micrometers--

Signed and Sealed this
Eleventh Day of February, 2020

Andrei Iancu
*Director of the United States Patent and Trademark Office*